United States Patent
Yu et al.

(10) Patent No.: US 12,487,496 B2
(45) Date of Patent: Dec. 2, 2025

(54) DISPLAY SUBSTRATE, METHOD OF DRIVING DISPLAY SUBSTRATE, DISPLAY PANEL AND DISPLAY DEVICE

(71) Applicants: Beijing BOE Optoelectronics Technology Co., Ltd., Beijing (CN); Beijing BOE Technology Development Co., Ltd., Beijing (CN)

(72) Inventors: Zhiqiang Yu, Beijing (CN); Xiaojuan Wu, Beijing (CN); Jian Wang, Beijing (CN); Feng Liu, Beijing (CN); Dawei Feng, Beijing (CN); Jiaxing Wang, Beijing (CN); Jinshuai Duan, Beijing (CN); Cuiyu Chen, Beijing (CN); Ning Wang, Beijing (CN); Danxing Hou, Beijing (CN); Yichi Zhang, Beijing (CN); Mingjing Liu, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/711,689

(22) PCT Filed: Apr. 28, 2023

(86) PCT No.: PCT/CN2023/091449
§ 371 (c)(1),
(2) Date: May 20, 2024

(87) PCT Pub. No.: WO2024/221377
PCT Pub. Date: Oct. 31, 2024

(65) Prior Publication Data
US 2025/0155763 A1 May 15, 2025

(51) Int. Cl.
*G09G 3/36* (2006.01)
*G02F 1/1335* (2006.01)
(Continued)

(52) U.S. Cl.
CPC ...... *G02F 1/1368* (2013.01); *G02F 1/133514* (2013.01); *G02F 1/133531* (2021.01); *G02F 1/13439* (2013.01); *G02F 1/136286* (2013.01)

(58) Field of Classification Search
CPC ...... G09G 3/36–3696; G02F 1/136286; G02F 1/136213
See application file for complete search history.

(56) References Cited

U.S. PATENT DOCUMENTS 5,724,107 A 3/1998 Nishikawa et al.
8,730,422 B2 5/2014 Park et al.
(Continued)

FOREIGN PATENT DOCUMENTS

CN 202839610 U 3/2013
CN 103424943 B 12/2013
(Continued)

*Primary Examiner* — Sanghyuk Park
(74) *Attorney, Agent, or Firm* — Westman, Champlin & Koehler, P.A.

(57) ABSTRACT

A display substrate, a display panel and a display device. The display substrate includes: a first base substrate; a first transparent electrode layer on the first base substrate; a second transparent electrode layer on a side of the first transparent electrode layer away from the first base substrate; first common signal lines and second common signal lines in the first transparent electrode layer, the first common signal lines being electrically connected through the second common signal lines; and a sub-pixel on the first base substrate, including a pixel electrode in the second transparent electrode layer. The first common signal lines and the second common signal lines form a transparent conductive portion. In a thickness direction of the display substrate, the
(Continued)

pixel electrode overlaps with the transparent conductive portion to form an overlapping region, in which the pixel electrode and the transparent conductive portion form a storage capacitor of the sub-pixel.

20 Claims, 15 Drawing Sheets

(51) Int. Cl.
    *G02F 1/1343* (2006.01)
    *G02F 1/1362* (2006.01)
    *G02F 1/1368* (2006.01)

(56) References Cited

U.S. PATENT DOCUMENTS

| | | |
|---|---|---|
| 9,229,287 B2 | 1/2016 | Choi et al. |
| 9,261,746 B2 | 2/2016 | Uchida et al. |
| 2007/0058096 A1* | 3/2007 | Tsai ............... G09G 3/3648 349/38 |
| 2013/0314658 A1 | 11/2013 | Park et al. |
| 2014/0061691 A1 | 3/2014 | Choi et al. |
| 2014/0176845 A1 | 6/2014 | Uchida et al. |
| 2016/0062202 A1* | 3/2016 | Hirosawa ........ G02F 1/134363 349/138 |
| 2024/0313008 A1* | 9/2024 | Zhang ............... G02F 1/1368 |

FOREIGN PATENT DOCUMENTS

| | | |
|---|---|---|
| CN | 103765306 A | 4/2014 |
| CN | 104777689 A | 7/2015 |
| CN | 106896610 A | 6/2017 |
| CN | 110687731 A | 1/2020 |
| CN | 113267927 A | 8/2021 |
| CN | 113934062 A | 1/2022 |
| JP | H06265940 A | 9/1994 |
| JP | H11231346 A | 8/1999 |
| JP | 2003330391 A | 11/2003 |

* cited by examiner

DISPLAY SUBSTRATE, METHOD OF DRIVING DISPLAY SUBSTRATE, DISPLAY PANEL AND DISPLAY DEVICE

CROSS REFERENCE TO RELATED APPLICATION(S)

This application is a Section 371 National Stage Application of International Application No. PCT/CN2023/091449, filed on Apr. 28, 2023, entitled "DISPLAY SUBSTRATE, METHOD OF DRIVING DISPLAY SUBSTRATE, DISPLAY PANEL AND DISPLAY DEVICE", the whole disclosure of which is incorporated herein by reference in its entirety.

TECHNICAL FIELD

The present disclosure relates to a field of display technology, and in particular to a display substrate, a method of driving a display substrate, a display panel, and a display device.

BACKGROUND

With the continuous advancement of technology, people have an increasing demand for display in various life scenes. Transmissive Liquid Crystal Display (LCD) technology is mature, but in outdoor scenes with relatively strong external light, the transmissive LCD often have problems such as dim screens and severe heating. In contrast, the advantages of reflective LCD are particularly prominent, the reflective LCD does not need backlight and directly uses a reflection of ambient light to achieve display. The stronger the ambient light is, the clearer and more vivid the displayed image will be.

SUMMARY

The present disclosure provides a display substrate, a method of driving a display substrate, a display panel and a display device.

According to a first aspect of the present disclosure, a display substrate is provided, including:
a first base substrate;
a first transparent electrode layer on the first base substrate;
a second transparent electrode layer on a side of the first transparent electrode layer away from the first base substrate;
M first common signal lines and N second common signal lines in the first transparent electrode layer, where the M first common signal lines are arranged in a first direction, the N second common signal lines are arranged in a second direction, the first direction intersects with the second direction, and the M first common signal lines are electrically connected through the N second common signal lines, and M and N are positive integers; and
a sub-pixel on the first base substrate,
where the sub-pixel includes a pixel electrode located in the second transparent electrode layer, and the M first common signal lines and the N second common signal lines form a transparent conductive portion; and in a thickness direction of the display substrate, the pixel electrode overlaps with the transparent conductive portion, and in an overlapping region of the pixel electrode and the transparent conductive portion, the pixel electrode and the transparent conductive portion form a storage capacitor of the sub-pixel.

According to embodiments of the present disclosure, the pixel electrode includes a middle portion and an edge portion surrounding the middle portion, and in the thickness direction of the display substrate, the edge portion overlaps with the transparent conductive portion.

According to embodiments of the present disclosure, a portion of the edge portion overlapping with the transparent conductive portion forms a first electrode plate of the storage capacitor, the transparent conductive portion forms a second electrode plate of the storage capacitor, and in a same sub-pixel, an orthographic projection of the portion of the edge portion overlapping with the transparent conductive portion on the first base substrate includes a continuous annular structure.

According to embodiments of the present disclosure, the display substrate includes a data line disposed on the first base substrate and electrically connected to the sub-pixel, the data line extends in the second direction, and at least one first common signal line includes at least one first segment; in the thickness direction of the display substrate, the data line overlaps with the at least one first line segment, and in an overlapping region of the data line and the at least one first line segment, an orthographic projection of the data line on the first base substrate is located within an orthographic projection of the first line segment on the first base substrate; and the at least one first line segment includes a first edge and a second edge arranged sequentially in the first direction, the data line includes a third edge and a fourth edge arranged sequentially in the first direction, and in the overlapping region of the data line and the at least one first line segment, a distance between the first edge of the first line segment and the third edge of the data line is less than a distance between the second edge of the first line segment and the fourth edge of the data line.

According to embodiments of the present disclosure, the display substrate includes a plurality of sub-pixels, each of the plurality of sub-pixels includes a switching transistor, and a plurality of switching transistors are arranged in an array in the first direction and the second direction; and an orthographic projection of the at least one first line segment on the first base substrate is located between orthographic projections of two adjacent switching transistors in the second direction on the first base substrate.

According to embodiments of the present disclosure, in the thickness direction of the display substrate, the at least one first line segment overlaps with an edge of the pixel electrode on a side of the pixel electrode facing the data line, an overlapping portion of the at least one first line segment and the edge of the pixel electrode forms an adjustment portion of the transparent conductive portion. A dimension of the adjustment portion in the first direction is positively correlated with a capacitance value of the storage capacitor.

According to embodiments of the present disclosure, the display substrate further includes a data line, a first gate line and a second gate line disposed on the first base substrate and electrically connected to the sub-pixel, where the N second common signal lines, the first gate line and the second gate line extend in the first direction, and the sub-pixel includes a switching transistor; the switching transistor includes a first electrode, a second electrode, a first gate and a second gate, the first electrode is electrically connected to the data line, the second electrode is electrically connected to the pixel electrode, the first gate is electrically connected to the first gate line, and the second gate is electrically connected to the second gate line; and in the thickness direction of the display substrate, at least one second common signal line overlaps with the first gate line and the second gate line.

According to embodiments of the present disclosure, the display substrate further includes a data line and a third gate line disposed on the first base substrate and electrically connected to the sub-pixel, where the N second common signal lines and the third gate line extend in the first direction, and the sub-pixel includes a switching transistor; the switching transistor includes a first electrode, a second electrode, a first gate and a second gate, the first gate and the second gate are arranged in the first direction, the first electrode is electrically connected to the data line, the second electrode is electrically connected to the pixel electrode, and the first gate and the second gate are electrically connected to the third gate line; and in the thickness direction of the display substrate, at least one second common signal line overlaps with the third gate line.

According to embodiments of the present disclosure, the display substrate further includes an active layer on a side of the first transparent electrode layer facing the first base substrate, where the switching transistor further includes a first channel portion and a second channel portion located in the active layer, an orthographic projection of the first channel portion on the first base substrate at least partially overlaps with an orthographic projection of the first gate on the first base substrate, and an orthographic projection of the second channel portion on the first base substrate at least partially overlaps with an orthographic projection of the second gate on the first base substrate; and an aspect ratio of any one of the first channel portion and the second channel portion is less than or equal to 4.

According to embodiments of the present disclosure, a channel length of the first channel portion and a channel length of the second channel portion are substantially equal to each other.

According to embodiments of the present disclosure, the at least one second common signal line is provided with a first hollow portion, and in the thickness direction of the display substrate, the first hollow portion overlaps with the first gate line and the second gate line.

According to embodiments of the present disclosure, an overlapping dimension between the first hollow portion and the first gate line in the second direction and an overlapping dimension between the first hollow portion and the second gate line in the second direction are less than a dimension of the data line in the first direction.

According to embodiments of the present disclosure, an orthographic projection of the first hollow portion on the first base substrate includes a strip-shaped structure extending in the first direction, and a dimension of the first hollow portion in the second direction is greater than or equal to a dimension of the data line in the first direction.

According to embodiments of the present disclosure, the at least one second common signal line includes a first sub-line and a second sub-line arranged in the second direction, and the first hollow portion separates the first sub-line and the second sub-line; and in the thickness direction of the display substrate, the first sub-line of the at least one second common signal line at least partially overlaps with the first gate line, and the second sub-line at least partially overlaps with the second gate line.

According to embodiments of the present disclosure, the display substrate includes a plurality of sub-pixels, and in the thickness direction of the display substrate, the first gate line and the second gate line electrically connected to a same sub-pixel overlap with pixel electrodes of two adjacent sub-pixels in the second direction, respectively; where for the first gate line and the second gate line connected to an $x^{th}$ sub-pixel, in the thickness direction of the display substrate, the pixel electrode of the $x^{th}$ sub-pixel overlaps with the first gate line, an orthographic projection of an overlapping portion of the pixel electrode of the $x^{th}$ sub-pixel and the first gate line on the first base substrate defines a first region, the pixel electrode of an $(x+1)^{th}$ sub-pixel overlaps with the second gate line, and an orthographic projection of an overlapping portion of the pixel electrode of the $(x+1)^{th}$ sub-pixel and the second gate line on the first base substrate defines a second region; and an orthographic projection of the first sub-line of the at least one second common signal line on the first base substrate at least partially overlaps with the first region, and an orthographic projection of the second sub-line of the at least one second common signal line on the first base substrate at least partially overlaps with the second region; and where x is a positive integer.

According to embodiments of the present disclosure, the orthographic projection of the first sub-line of the at least one second common signal line on the first base substrate covers the first region, and the orthographic projection of the second sub-line of the at least one second common signal line on the first base substrate covers the second region.

According to embodiments of the present disclosure, the first sub-line and the second sub-line are electrically connected to each other through a connection bridge located at at least one end of the first hollow portion, and a dimension of the connection bridge in the first direction is greater than or equal to a dimension of the data line in the first direction.

According to embodiments of the present disclosure, the connection bridge does not overlap with the data line, and a distance between the connection bridge and the data line in the first direction is less than a width of the data line.

According to embodiments of the present disclosure, in the thickness direction of the display substrate, the pixel electrode overlaps with the third gate line, and an orthographic projection of an overlapping portion of the pixel electrode and the third gate line on the first base substrate defines a third region, and an orthographic projection of at least one second common signal line on the first base substrate at least partially overlaps with the third region.

According to embodiments of the present disclosure, the orthographic projection of the at least one second common signal line on the first base substrate covers the third region.

According to embodiments of the present disclosure, at least one second common signal line is provided with a second hollow portion, and an orthographic projection of the switching transistor on the first base substrate is located within an orthographic projection of the second hollow portion on the first base substrate.

According to embodiments of the present disclosure, the display substrate includes a plurality of sub-pixels arranged in an array in the first direction and the second direction; a second gate line electrically connected to a second gate of a switching transistor of an $n^{th}$ row of sub-pixels and a first gate line electrically connected to a first gate of a switching transistor of an $(n+1)^{th}$ row of sub-pixels are electrically connected to a same scanning signal terminal; where n is a positive integer.

According to a second aspect of the present disclosure, a display panel is provided, including a color filter substrate and the display substrate as described above; The display panel further includes: a color filter substrate disposed opposite to the display substrate; and a liquid crystal layer between the display substrate and the color filter substrate, where the color filter substrate includes a second base substrate and a common electrode disposed on the second base substrate, the common electrode is electrically connected to the first common signal line and the second common signal line in the display substrate, the liquid crystal layer includes a plurality of liquid crystal molecules, and the common electrode and the pixel electrode on the display substrate are configured such that: in response to a driving signal, an electric field driving a rotation of the liquid crystal molecules is formed.

According to embodiments of the present disclosure, a ratio of a cell gap of the liquid crystal layer to a distance between the first transparent electrode layer and the second transparent electrode layer is greater than or equal to 20:1.

According to a third aspect of the present disclosure, a reflective display device is provided, including the display panel as described above. The display device further includes:
- a first polarizer;
- a selective wavelength transmission film on a side of the display panel away from the first polarizer; and
- a second polarizer on a side of the selective wavelength transmission film away from the first polarizer,
- where the first polarizer has a first transmission axis and is configured to generate a first polarized light with a polarization direction parallel to the first transmission axis, the second polarizer has a second transmission axis and is configured to generate a second polarized light with a polarization direction parallel to the second transmission axis, and an extension direction of the first transmission axis intersects with an extension direction of the second transmission axis; and
- the selective wavelength transmission film is configured to reflect the first polarized light and transmit the second polarized light.

According to embodiments of the present disclosure, the display device further includes a light-absorbing layer on a side of the selective wavelength transmission film away from the display panel, where the light-absorbing layer is configured to absorb the second polarized light transmitted by the selective wavelength transmission film.

According to a fourth aspect of the present disclosure, a method of driving a display substrate is provided. The display substrate includes: a first base substrate; a first transparent electrode layer on the first base substrate; a second transparent electrode layer on a side of the first transparent electrode layer away from the first base substrate; M first common signal lines and N second common signal lines in the first transparent electrode layer, where the M first common signal lines are arranged in a first direction, the N second common signal lines are arranged in a second direction, the first direction intersects with the second direction, the M first common signal lines are electrically connected through the N second common signal lines, and M and N are positive integers; and a sub-pixel on the first base substrate, wherein the sub-pixel includes a pixel electrode located in the second transparent electrode layer, and the M first common signal lines and the N second common signal lines form a transparent conductive portion; and in a thickness direction of the display substrate, the pixel electrode overlaps with the transparent conductive portion, and in an overlapping region of the pixel electrode and the transparent conductive portion, the pixel electrode and the transparent conductive portion form a storage capacitor of the sub-pixel; wherein the display substrate further includes a data line, a first gate line and a second gate line, and the sub-pixel includes a switching transistor; the switching transistor includes a first electrode, a second electrode, a first gate and a second gate, the first electrode is electrically connected to the data line, the second electrode is electrically connected to the pixel electrode, the first gate is electrically connected to the first gate line, and the second gate is electrically connected to the second gate line; wherein the display substrate includes a plurality of sub-pixels arranged in an array in the first direction and the second direction; a second gate line electrically connected to a second gate of a switching transistor of an $n^{th}$ row of sub-pixels and a first gate line electrically connected to a first gate of a switching transistor of an $(n+1)^{th}$ row of sub-pixels are electrically connected to a same scanning signal terminal, and the n is a positive integer; and wherein the driving method includes: in a first data writing phase of the $n^{th}$ row of sub-pixels, providing a valid level signal to the first gate line electrically connected to the $n^{th}$ row of sub-pixels, and providing an invalid level signal to the second gate line electrically connected to the $n^{th}$ row of sub-pixels; in a second data writing phase of the $n^{th}$ row of sub-pixels, providing a valid level signal to the first gate line electrically connected to the $n^{th}$ row of sub-pixels, and providing a valid level signal to the second gate line electrically connected to the $n^{th}$ row of sub-pixels; and in a display phase of the $n^{th}$ row of sub-pixels, providing an invalid level signal to the first gate line electrically connected to the $n^{th}$ row of sub-pixels, and providing a valid level signal to the second gate line electrically connected to the $n^{th}$ row of sub-pixels.

BRIEF DESCRIPTION OF THE DRAWINGS

Through the following descriptions of embodiments of the present disclosures with reference to accompanying drawings, the above content, and other purposes, features and advantages of the present disclosure will be clearer, and in the drawings.

DETAILED DESCRIPTION OF EMBODIMENTS

Figure 1:
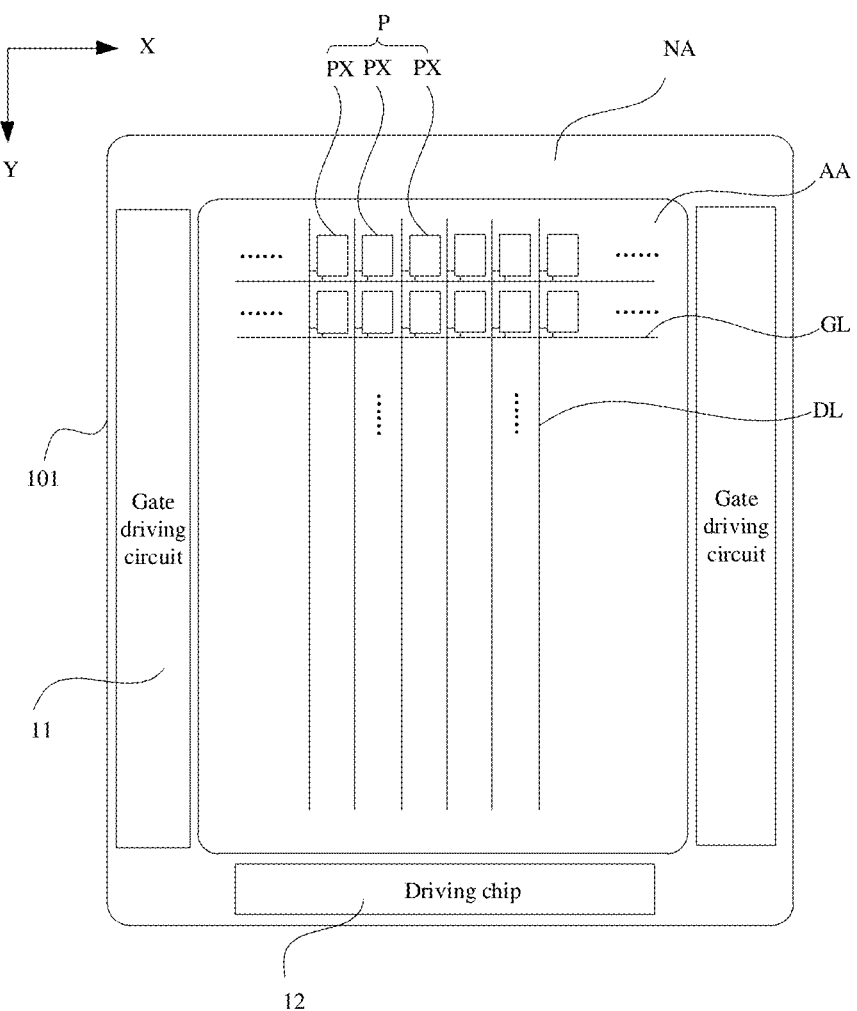
FIG. 1 schematically shows a plan view of a display substrate according to embodiments of the present disclosure.

In order to make purposes, technical solutions, and advantages of embodiments of the present disclosure clearer, technical solutions in embodiments of the present disclosure will be described clearly and completely in combination with accompanying drawings. Clearly, the described embodiments are only part of embodiments of the present disclosure, not all of embodiments. Based on the described embodiments of the present disclosure, all other embodiments obtained by those of ordinary skill in the art without creative labor fall within the protection scope of the present disclosure.

It should be noted that, in the accompanying drawings, a dimension and a relative dimension of an element may be enlarged for clarity and/or description. In this way, the dimension and relative dimension of each element do not need to be limited to the dimension and relative dimension shown in the figure. In the specification and the accompanying drawings, the same or similar reference number indicates the same or similar component.

When an element is described as being "on", "connected to", or "coupled to" another element, the element may be directly on, directly connected to, or directly coupled to the another element, or an intermediate element may exist. However, when an element is described as being "directly on", "directly connected to", or "directly coupled to" another element, there is no intermediate element. Other terms and/or expressions used to describe a relationship between elements will be interpreted in a similar manner, e.g., "between" versus "directly between", "adjacent" versus "directly adjacent", or "on" versus "directly on" etc. Furthermore, the term "connected" may refer to a physical connection, an electrical connection, a communication connection, and/or a fluid connection. In addition, an X axis, a Y axis and a Z axis are not limited to the three axes of a rectangular coordinate system, and may be interpreted in a broader sense. For example, the X, Y, and Z axes may be perpendicular to each other, or may represent different directions that are not perpendicular to each other. For the purposes of the present disclosure, "at least one of X, Y, or Z" and "at least one selected from the group composed of X, Y, and Z" may be interpreted as only X, only Y, only Z, or any combination of two or more of X, Y and Z such as XYZ, XYY, YZ and ZZ. As used herein, the term "and/or" includes any combination and all combinations of one or more of the listed associated items.

It should be noted that although the terms "first", "second", etc. may be used here to describe various components, members, elements, regions, layers, and/or parts, these components, members, elements, regions, layers, and/or parts should not be limited by these terms. Instead, these terms are used to distinguish one component, member, element, region, layer, and/or part from another component, member, element, region, layer, and/or part. Therefore, for example, the first component, the first member, the first element, the first region, the first layer, and/or the first part described below may be referred to as the second component, the second member, the second element, the second region, the second layer, and/or the second part, without departing from the teachings of the present disclosure.

For ease of description, a spatially relational term, e.g., "upper", "lower", "left", "right", etc. may be used herein to describe a relationship between one element or feature with another element or feature as shown in the drawings. It should be understood that the spatially relational terms are intended to encompass other different orientations of the apparatus in use or operation in addition to an orientation depicted in the drawings. For example, if the apparatus in the drawings is turned over, the elements described as "below" or "beneath" the other elements or features may then be oriented "above" or "on" the other elements or features.

In the present disclosure, the terms "substantially", "about", "approximately", "substantially" and other similar terms are used as approximate terms rather than as terms of degree, and they are intended to explain the fixed deviation of measured or calculated values that will be recognized by those of ordinary skill in the art. Taking into account factors such as process fluctuations, measurement problems and errors related to the measurement of a specific amount (i.e., the limitations of the measurement system), the "about" or "approximately" used here includes the stated value, and indicates that the specific value determined by those of ordinary skill in the art is within the acceptable deviation range. For example, "about" may be expressed within one or more standard deviations, or within +30%, +20%, +10%, +5% of the stated values.

It should be noted that, in the present disclosure, the term "same layer" refers to a layer structure formed by using the same film-forming process to form a film layer with a specific pattern, followed by patterning the film layer through a single patterning process using the same mask. Depending on the specific shape, the single patterning process may include multiple exposure, development, or etching processes, and the specific shape in the formed layer structure may be continuous or discontinuous. That is, a plurality of elements, components, structures, and/or parts located in the "same layer" are composed of the same material and formed through the same patterning process. Typically, the plurality of elements, components, structures, and/or parts located in the "same layer" have substantially the same thickness.

Those skilled in the art should understand that in the present disclosure, unless otherwise specified, the term "height" or "thickness" refers to the dimensions along the surface of each film layer provided perpendicular to the display substrate, that is, the dimensions in the direction of light output of the display substrate, or the dimensions in the normal direction of the display device.

In a comparison example, a total reflective liquid crystal display panel is provided. In this comparison example, the display panel includes a first base substrate and a plurality of pixel units arranged in an array in a first direction and a second direction on the first base substrate. The pixel unit includes a plurality of sub-pixels, and in a same pixel unit, different sub-pixels are used to display different colors. For example, the pixel unit may include a first sub-pixel, a second sub-pixel and a third sub-pixel. The first sub-pixel, the second sub-pixel and the third sub-pixel cooperate with respective color filters (such as a red filter, a green filter and a blue filter) to achieve the display of corresponding colors. For ease of understanding, the first sub-pixel may be described as a red sub-pixel, the second sub-pixel may be described as a green sub-pixel, and the third sub-pixel may be described as a blue sub-pixel.

The display panel further includes a plurality of gate lines and a plurality of data lines. The plurality of gate lines extend in the first direction, and the plurality of data lines extend in the second direction. The gate line is electrically connected to a row of sub-pixels, and the data line is electrically connected to a column of sub-pixels. In other words, the sub-pixel is correspondingly connected to the gate line and the data line. This type of display panel is also referred to as 1G1D type display panel.

The sub-pixel includes a switching transistor and a pixel storage capacitor electrically connected to the switching transistor. A gate of the switching transistor is electrically connected to the gate line, and a first electrode of the switching transistor and a second electrode of the switching transistor are electrically connected to the data line and the pixel storage capacitor, respectively. The switching transistor are turned on or turned off under control of an electrical signal on the gate line, and a voltage written into the pixel storage capacitor is determined by an electrical signal on the data line.

The display panel further includes a gate layer, a pixel electrode layer and a common electrode layer sequentially arranged in a direction away from the first base substrate. The gate line and the gate of the switching transistor may be located in the gate layer. The sub-pixel further includes a pixel electrode, a common electrode and a liquid crystal layer. The pixel electrode is located in the pixel electrode layer, and the common electrode is located in the common electrode layer. A liquid crystal in the liquid crystal layer may be deflected in response to a voltage between the pixel electrode and the common electrode, thereby achieving the display function of the sub-pixel.

The pixel storage capacitor includes a first electrode plate and a second electrode plate separated by insulation. The common electrode is electrically connected to a common signal terminal through a common signal line, and the common signal terminal is used to provide a common voltage. The first electrode plate and the common signal line are located in the gate layer and may form an integrated structure. In other words, in this comparison example, the common signal line is reused to form the first electrode plate of the pixel storage capacitor. For example, the second electrode plate is located in the pixel electrode layer, and in a thickness direction of the display panel, the common signal line at least partially overlaps with the second electrode plate. An overlapping portion of the common signal line and the second electrode plate may be reused as the first electrode plate of the pixel storage capacitor.

In this comparison example, the gate layer is made of a metal material, so that the common signal line located in the gate layer is opaque (or has a low light transmittance). Therefore, a layout of the common signal line may occupy a pixel opening region of the sub-pixel, so that the aperture ratio of the pixel is reduced. Moreover, a dimension of the common signal line is limited by the aperture ratio of the pixel, and an overlapping area of the common signal line and the pixel electrode may only be adjusted within a small range, resulting in a small capacitance value of the pixel storage capacitor and poor design flexibility, therefore, it is difficult to meet the requirement of large capacitance value.

In view of this, embodiments of the present disclosure provide a display substrate, including: a first base substrate; a first transparent electrode layer on the first base substrate; a second transparent electrode layer on a side of the first transparent electrode layer away from the first base substrate; a plurality of first common signal lines and a plurality of second common signal lines in the first transparent electrode layer, where the plurality of first common signal lines are arranged in a first direction, the plurality of second common signal lines are arranged in a second direction, the first direction intersects with the second direction, and the plurality of first common signal lines are electrically connected through the plurality of second common signal lines; and a sub-pixel on the first base substrate, where the sub-pixel includes a pixel electrode located in the second transparent electrode layer, and the plurality of first common signal lines and the plurality of second common signal lines form a transparent conductive portion; and in a thickness direction of the display substrate, the pixel electrode overlaps with the transparent conductive portion, and in an overlapping region of the pixel electrode and the transparent conductive portion, the pixel electrode and the transparent conductive portion form a storage capacitor of the sub-pixel.

In embodiments of the present disclosure, the first common signal line and the second common signal line are located in the first transparent electrode layer. The first transparent electrode layer may be made of a transparent conductive material. For example, the transparent conductive material may include but not limited to indium tin oxide (ITO), etc. In other words, in embodiments of the present disclosure, the first common signal line and the second common signal line are made of a transparent conductive material, with a light transmittance greater than that of a conductive film layer (such as a gate layer) made of an opaque metal material.

The common signal lines (the first common signal line and the second common signal line) in embodiments of the present disclosure are located in the first transparent electrode layer and made of a transparent conductive material. A light transmittance of the common signal line in embodiments of the present disclosure is greater than a light transmittance of the common signal line which is disposed in the gate layer and made of an opaque metal material in the comparison example. Furthermore, when using a transparent common signal line to form a storage capacitor in embodiments of the present disclosure, it is possible to reduce the occupation of the pixel opening region, thereby improving the aperture ratio of the pixel.

With reference to FIG. 1 to FIG. 19, the display substrate in embodiments of the present disclosure will be described in detail below.

FIG. 1 schematically shows a plan view of a display substrate according to embodiments of the present disclosure.

With reference to FIG. 1, the display substrate in embodiments of the present disclosure includes a display region AA and a peripheral region NA located at least one side of the display region AA.

The display region AA may have various shapes. For example, the display region AA may have various shapes such as a shape of a closed polygon (such as rectangle) including straight sides; a shape of a circle or an ellipse, etc. including curved sides; or a shape of a semicircle or a semi ellipse, etc. including straight sides and curved sides. In embodiments of the present disclosure, the display region AA is provided as a region with a quadrilateral shape including straight sides. It should be understood that this is only an exemplary embodiment of the present disclosure, rather than a limitation on the present disclosure.

The non-display region NA may be disposed on at least one side of the display region AA. In embodiments of the present disclosure, the non-display region NA may surround a periphery of the display region AA. In embodiments of the present disclosure, the non-display region NA may include a longitudinal portion extending in the second direction Y and a lateral portion extending in the first direction X.

The display substrate may further include a gate driving circuit 11 and a driving chip 12 in the peripheral region NA. For example, the gate driving circuit 11 may be located on at least one side of the display region AA. In the embodiment shown in FIG. 1, both the left side and the right side of the display region AA are provided with the gate driving circuit 11. It should be noted that the left side and the right side may refer to the left side and the right side of the display substrate (screen) viewed by eyes during display. For example, the driving chip 12 may be located on at least one side of the display region AA. In the embodiment shown in FIG. 1, the driving chip 12 is located on a lower side of the display region AA. It should be noted that the lower side may be the lower side of the display substrate (screen) viewed by eyes during display.

The driving chip 12 includes a data driving circuit. The data driving circuit is used to sequentially and periodically lock input data based on a clock signal and convert the locked data into an analog signal, and then input the analog signal onto various data lines of the display substrate. The gate driving circuit 11 is usually implemented by a shift register. The shift register converts the clock signal into a turn-on/turn-off voltage and outputs the turn-on/turn-off voltage to various gate lines of the display substrate.

It should be noted that although FIG. 1 shows the gate driving circuit 11 on the left and right sides of the display region AA and the driving chip 12 on the lower side of the display region AA, embodiments of the present disclosures are not limited to this. The gate driving circuit 11 and the driving chip 12 may be located at any suitable position in the peripheral region NA.

For example, the gate driving circuit 11 may adopt GOA technology, that is, Gate Driver on Array. In GOA technology, the gate driving circuit 11 is directly disposed on the display substrate, so as to replace an external chip. Each GOA unit serves as a stage of shift register, and each stage of shift register is connected to a gate line. Through outputting a scanning signal by each stage of shift register sequentially, the scanning of pixel units row by row may be achieved. In some embodiments, each stage of shift register may be connected to multiple gate lines. In this way, it may adapt to a development trend of high resolution and narrow border of display substrate. The driving chip 12 may be folded onto a back side of the display substrate through a structure such as chip on film.

The display substrate (or may be referred to as array substrate) in embodiments of the present disclosure may be applied to a total reflective liquid crystal display device. The total reflective liquid crystal display device does not have backlight, but uses the ambient light to achieve display function. This type of display device has higher display brightness in application scenes with strong ambient light (such as outdoor billboards, etc.), and the stronger the ambient light is, the clearer the displayed image will be and the more vivid the color will be. The specific structure and operating principle of the total reflective liquid crystal display device will be described in detail below, which will not be elaborated herein.

In embodiments of the present disclosure, the display substrate may further include a first base substrate 101, a plurality of pixel units P in the display region AA on the first base substrate 101. The plurality of pixel units P may be arranged in an array in the second direction Y and the first direction X. Each pixel unit P may include a plurality of sub-pixels PX, such as a first sub-pixel, a second sub-pixel and a third sub-pixel. The first sub-pixel, the second sub-pixel and the third sub-pixel cooperate with the color filters (such as a red filter, a green filter and a blue filter) so as to achieve the display of corresponding colors. For ease of understanding, the first sub-pixel, the second sub-pixel and the third sub-pixel may be described as a red sub-pixel, a green sub-pixel and a blue sub-pixel, respectively. However, embodiments of the present disclosure are not limited to this.

In embodiments of the present disclosure, the display substrate further includes a plurality of gate lines GL and a plurality of data lines DL. The gate lines GL extend in the first direction X, and the data lines DL extend in the second direction Y. In embodiments of the present disclosure, one sub-pixel PX is correspondingly connected to one data line DL and at least one gate line GL.

Figure 2:
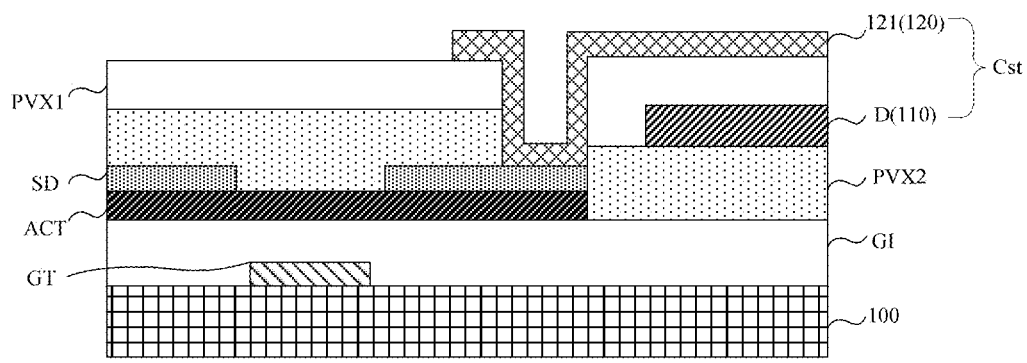
FIG. 2 schematically shows a cross-sectional view of a display substrate according to embodiments of the present disclosure.
Figure 3:
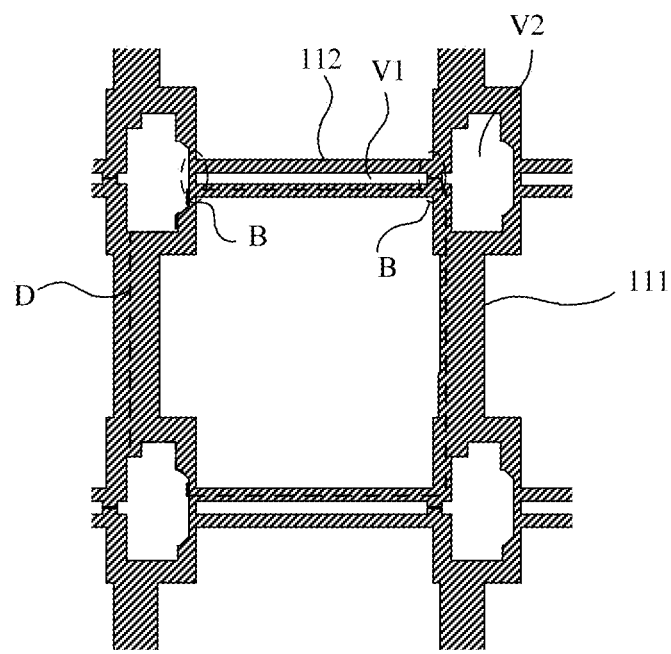
FIG. 3 schematically shows a plan view of a first transparent electrode layer according to embodiments of the present disclosure.
Figure 4:
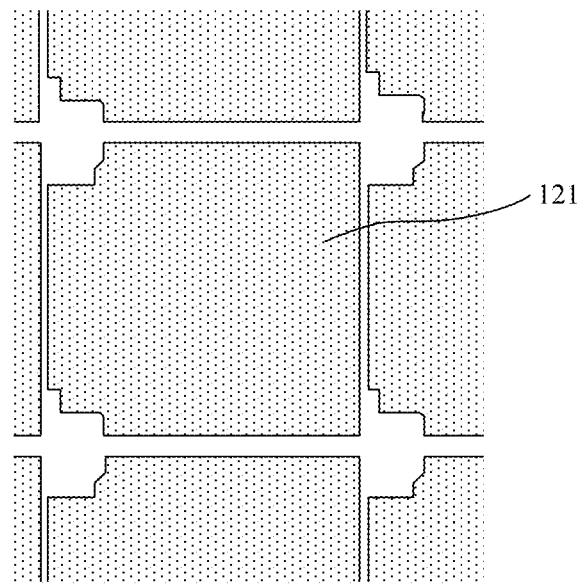
FIG. 4 schematically shows a plan view of a second transparent electrode layer according to embodiments of the present disclosure.
Figure 5:
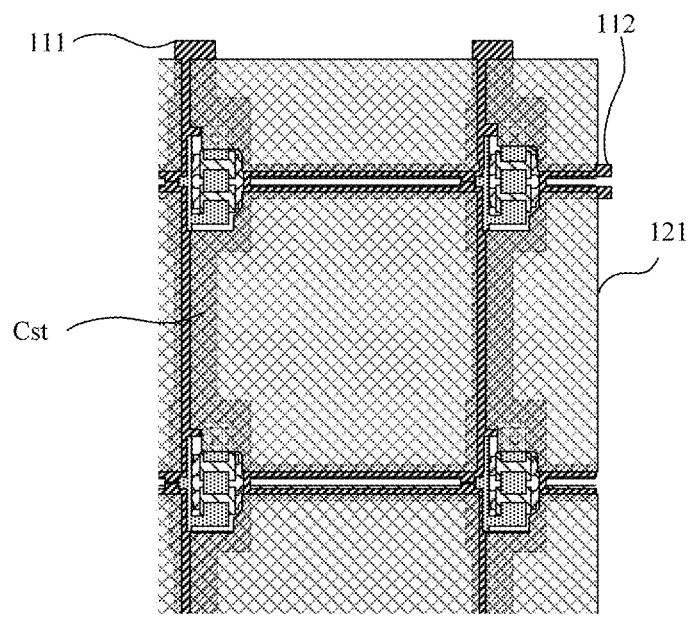
FIG. 5 schematically shows a plan view of a sub-pixel and surroundings of the sub-pixel according to embodiments of the present disclosure.

FIG. 2 schematically shows a cross-sectional view of a display substrate according to embodiments of the present disclosure. FIG. 3 schematically shows a plan view of a first transparent electrode layer according to embodiments of the present disclosure. FIG. 4 schematically shows a plan view of a second transparent electrode layer according to embodiments of the present disclosure. FIG. 5 schematically shows a plan view of a sub-pixel and surroundings the sub-pixel according to embodiments of the present disclosure. With reference to FIG. 1 to FIG. 5, a transparent conductive portion D in embodiments of the present disclosure will be described below.

In embodiments of the present disclosure, the display substrate further includes a first transparent electrode layer 110 on the first base substrate 101, a second transparent electrode layer 120 on a side of the first transparent electrode layer 110 away from the first base substrate 101, and a sub-pixel PX on the first base substrate 101. The sub-pixel PX includes a pixel electrode 121 located in the second transparent electrode layer 120. It should be noted that in embodiments of the present disclosure, the display substrate may include a plurality of sub-pixels PX. For clarity, unless otherwise specified, one sub-pixel PX is taken as an example in embodiments of the present disclosure. Therefore, the sub-pixel PX here may refer to one of the plurality of sub-pixels PX in the display substrate.

In embodiments of the present disclosure, the display substrate further includes M first common signal lines 111 and N second common signal lines 112 in the first transparent electrode layer 110, where M and N are positive integers. The M first common signal lines 111 are arranged in the second direction Y, the N second common signal lines 112 are arranged in the first direction X, and the second direction Y intersects with the first direction X. The M first common signal lines 111 are electrically connected through the N second common signal lines 112. For example, the second direction Y may be a vertical direction in FIG. 1, and the first direction X may be a horizontal direction in FIG. 1, that is, the second direction Y and the first direction X are perpendicular to each other. The M first common signal lines 111 and the N second common signal lines 112 form a transparent conductive portion D.

It should be noted that in embodiments of the present disclosure, the first transparent electrode layer 110 may have a plurality of first common signal lines 111 and a plurality of second common signal lines 112. The plurality of first common signal lines 111 and the plurality of second common signal lines 112 may intersect with each other, so as to form a grid-like structure. The M first common signal lines 111 may refer to two adjacent ones of the plurality of first common signal lines 111, and the N second common signal lines 112 may refer to two adjacent ones of the plurality of second common signal lines 112. That is to say, the transparent conductive portion D is located in a grid of the grid-like structure formed by the plurality of first common signal lines 111 and the plurality of second common signal lines 112, and may specifically be a portion in this grid covered by the same pixel electrode 121, as shown by a dashed line in FIG. 3.

It should also be noted that in embodiments of the present disclosure, in the grid-like structure formed by the plurality of first common signal lines 111 and the plurality of second common signal lines 112, each grid may include a transparent conductive portion D. For clarity, unless otherwise specified, a transparent conductive portion D is taken as an example embodiment of the present disclosure. Therefore, in the above description, the transparent conductive portion D formed by the M first common signal lines 111 and the N second common signal lines 112 may refer to one of the plurality of transparent conductive portions D in the grid-like structure.

For example, two adjacent transparent conductive portions D share one first common signal line 111 (or second common signal line 112) between the two adjacent transparent conductive portions D. For example, two adjacent transparent conductive portions D in the second direction Y share one second common signal line 112, and two adjacent transparent conductive portions D in the first direction X share one first common signal line 111.

With reference to FIG. 5, in a thickness direction of the display substrate, the pixel electrode 121 overlaps with the transparent conductive portion D, and in an overlapping region of the pixel electrode 121 and the transparent conductive portion D, the pixel electrode 121 and the transparent conductive portion D form a storage capacitor Cst of the sub-pixel PX.

The sub-pixel PX further includes a switching transistor T on the first base substrate, and the pixel electrode 121 is electrically connected to the switching transistor T. The switching transistor T is electrically connected to a data line DL, a gate line GL and the pixel electrode 121. The switching transistor may transmit a data voltage on the data line DL to the pixel electrode 121, in response to a valid level signal on the gate line GL, and the data voltage is stored in the storage capacitor Cst formed by the pixel electrode 121 and the transparent conductive portion D. In this way, in a light-emitting phase, the pixel electrode 121 may be maintained at a desired potential, thereby cooperating with structures such as the common electrode and the liquid crystal layer, and achieving continuous display for one frame period.

The first transparent electrode layer 110 and the second transparent electrode layer 120 are made of transparent conductive materials, and the materials of the two may be the same or different. For example, the materials of the first transparent electrode layer 110 and the second transparent electrode layer 120 are the same, both of the two may include indium tin oxide.

The pixel electrode 121 may include a planar structure. The pixel electrodes 121 of different sub-pixels PX are separated by insulation. The transparent conductive portion D may include an annular structure.

In embodiments of the present disclosure, according to actual desires, a corresponding position on the pixel electrode 121 may be selected to overlap with the transparent conductive portion D, so as to form a storage capacitor Cst. For example, an edge of the pixel electrode 121 on at least one side of the pixel electrode 121 may be selected to overlap with the transparent conductive portion D, so as to form a storage capacitor Cst with a shape similar to a shape of "I", a shape of "L", or an annular shape The common signal lines (the first common signal line 111 and the second common signal line 112) in embodiments of the present disclosure are located in the first transparent electrode layer 110 and made of transparent conductive materials. A light transmittance of the common signal line in embodiments of the present disclosure is greater than a light transmittance of the common signal line which is disposed in the gate layer and made of an opaque metal material in the comparison example. Furthermore, when using transparent common signal lines (specifically using the transparent conductive portion D formed by the first common signal line 111 and the second common signal line 112) to form a storage capacitor in embodiments of the present disclosure, it is possible to reduce the occupation of the pixel opening region (specifically, the pixel opening region is occupied by an opaque common signal line in the comparison example), thereby improving the aperture ratio of the pixel. Moreover, the light transmittance of the transparent conductive portion D is relatively high, and the limitation of the aperture ratio of the pixel on the dimension of the transparent conductive portion D may be greatly reduced. Therefore, the adjustment range of the dimension of the transparent conductive portion D may be greatly increased. Furthermore, the storage capacitor Cst formed based on the transparent conductive portion D and the pixel electrode 121 has a larger adjustment space, which is conducive to forming a storage capacitor Cst with a larger capacitance value in the display substrate.

With reference to FIG. 1 to FIG. 19, the display substrate in embodiments of the present disclosure will be further described below.

Figure 6:
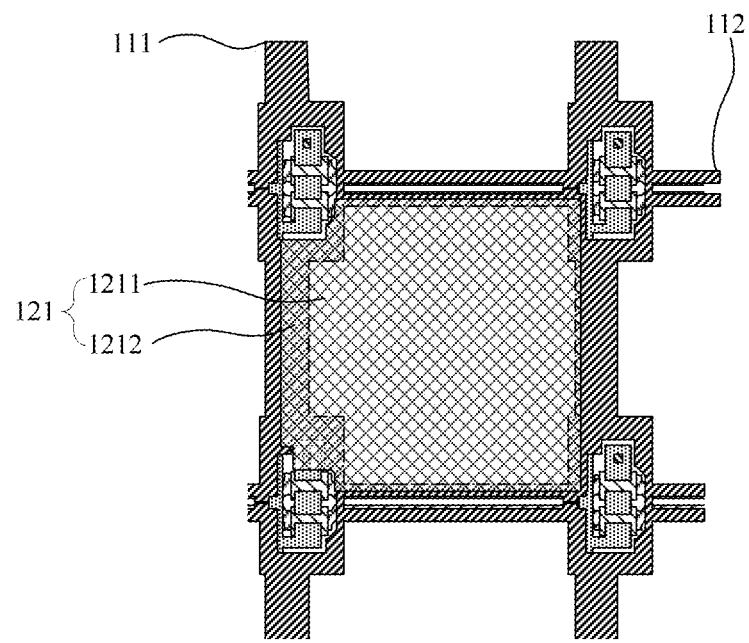
FIG. 6 schematically shows a plan view of a middle portion and an edge portion of a pixel electrode according to embodiments of the present disclosure.

FIG. 6 schematically shows a plan view of a middle portion and an edge portion of a pixel electrode according to embodiments of the present disclosure. With reference to FIG. 3 to FIG. 6, in some specific embodiments, the pixel electrode 121 includes a middle portion 1211 and an edge portion 1212 surrounding the middle portion 1211. In the thickness direction of the display substrate, the edge portion 1212 overlaps with the transparent conductive portion D, and the middle portion 1211 is spaced apart from the transparent conductive portion D. In other words, in embodiments of the present disclosure, the pixel electrode 121 overlaps with the transparent conductive portion D only at an edge of the pixel electrode 121.

The inventors found in the research that, the pixel electrode 121 and the transparent conductive portion D include indium tin oxide, which is a transparent conductive material with high transmittance, for example, the light transmittance of the visible light band is about 90%, however, the indium tin oxide still has a certain absorption effect on light, and as the film thickness increases, the absorption amount increases, resulting in a gradual decrease in the light transmittance. Moreover, there is a certain reflection effect at an interface between the pixel electrode 121 and the transparent conductive portion D, which causes the light transmittance to be further decreased. This causes the overlapping region of the pixel electrode 121 and the transparent conductive portion D to have a relatively lower light transmittance than the light transmittance of the region in which only pixel electrode 121 or transparent conductive portion D is disposed.

Therefore, in embodiments of the present disclosure, the pixel electrode 121 overlaps with the transparent conductive portion D only at the edge position, so that the overlapping region with relatively low light transmittance is limited to a periphery of the pixel electrode 121, and the middle region of the pixel electrode 121 maintains better light transmittance. In this way, it is possible to prevent the overlapping area of the pixel electrode 121 and the transparent conductive portion D from being too large, thereby causing the entire light transmittance of the sub-pixel PX to be decreased.

Alternatively, the overlapping regions of the pixel electrode 121 and the transparent conductive portion D may be dispersed at the edge positions. For example, an edge of the pixel electrode 121 on at least one side of the pixel electrode 121 may overlap with the transparent conductive portion D. For another example, edges of the pixel electrode 121 on at least two sides of the pixel electrode 121 may overlap with the transparent conductive portion D.

In some specific embodiments, a portion of the edge portion 1212 overlapping with the transparent conductive portion D forms a first electrode plate of the storage capacitor Cst, and the transparent conductive portion D forms a second electrode plate of the storage capacitor Cst. In the same sub-pixel PX, an orthographic projection of the portion of the edge portion 1212 overlapping with the transparent conductive portion D on the first base substrate 101 includes a continuous annular structure.

Therefore, it is possible to overlap four sides of the pixel electrode 121 with the transparent conductive portion D. In this way, it may prevent the overlapping region of the pixel electrode 121 and the transparent conductive portion D from being concentrated in a certain position, thereby avoiding the problem of entirely decrease in light transmittance of a certain region and significant difference in light transmittance at different positions caused by concentrating in a certain position.

In embodiments of the present disclosure, the display substrate further includes a first insulation layer PVX1 between the first transparent electrode layer 110 and the second transparent electrode layer 120. The transparent conductive portion D and the pixel electrode 121 are separated by the first insulation layer PVX1, so that the transparent conductive portion D and the pixel electrode 121 are separated by insulation, so as to form a storage capacitor Cst.

For example, an area of the transparent conductive portion D may be within a range of 5000 $\mu m^2$ to 6000 $\mu m^2$, for example, 5756 $\mu m^2$, which may be determined specifically according to actual desires and there is no limitation here.

In addition to improving the aperture ratio of the pixel and expanding the adjustment range of the capacitance value of the pixel, the power consumption of the display substrate may be reduced by the following methods in embodiments of the present disclosure.

In some specific embodiments, the display substrate includes a data line DL (such as the data line DL on the left side shown in FIG. 7) disposed on the first base substrate 101 and electrically connected to the sub-pixel. The data line DL extends in the second direction Y. At least one first common signal line 111 corresponds to at least one data line DL. Different first common signal lines 111 correspond to different data lines DL. The first common signal line 111 is parallel to the data line DL corresponding to the first common signal line 111. For example, an orthographic projection of the first common signal line 111 on the first base substrate 101 overlaps with an orthographic projection of the data line DL corresponding to the first common signal line 111 on the first base substrate 101.

Figure 7:
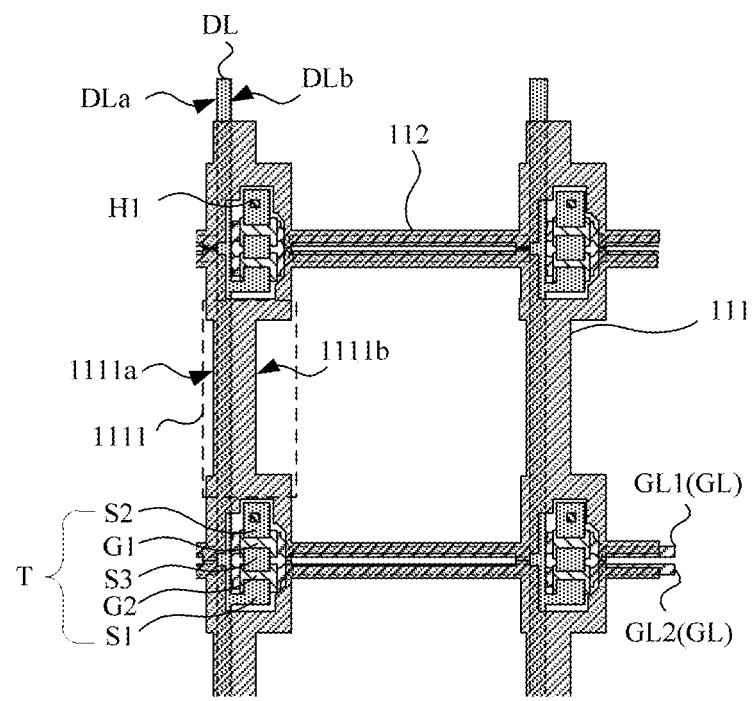
FIG. 7 schematically shows a plan view of a first line segment of a pixel electrode according to embodiments of the present disclosure.

FIG. 7 schematically shows a plan view of a first line segment of a pixel electrode according to embodiments of the present disclosure. With reference to FIG. 3 to FIG. 7, at least one first common signal line 111 includes at least one first line segment 1111. In the thickness direction of the display substrate, at least one data line DL overlaps with at least one first line segment 1111, and in an overlapping region of the data line DL and the at least one first line segment, an orthographic projection of the data line DL on the first base substrate 101 is located within an orthographic projection of the first line segment 1111 on the first base substrate 101.

Figure 8:
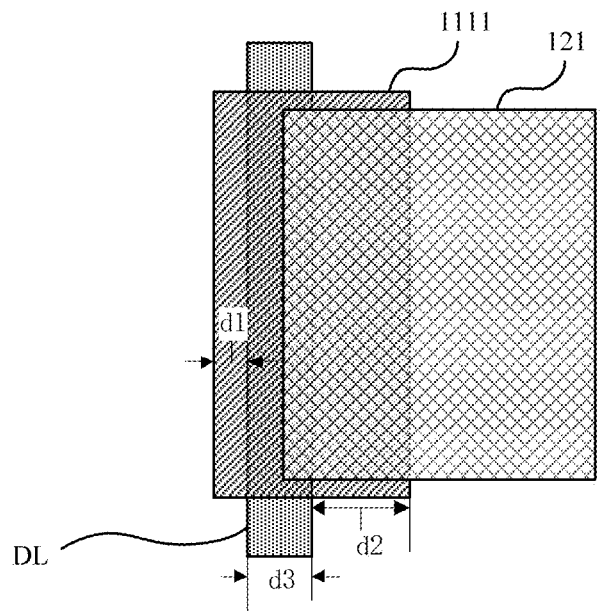
FIG. 8 schematically shows dimensions between a data line, a first line segment and a pixel electrode according to embodiments of the present disclosure.

FIG. 8 schematically shows a schematic diagram of dimensions between a data line, a first line segment and a pixel electrode according to embodiments of the present disclosure. With reference to FIG. 3 to FIG. 8, in embodiments of the present disclosure, at least one first line segment 1111 includes a first edge 1111a and a second edge 1111b arranged sequentially in the second direction Y, and the data line DL includes a third edge DLa and a fourth edge DLb arranged sequentially in the second direction Y, in an overlapping region of the data line DL and the first line segment 1111, a distance d1 between the first edge 1111a of the first line segment 1111 and the third edge DLa of the data line DL is less than a distance d2 between the second edge 1111b of the first line segment 1111 and the fourth edge DLb of the data line DL.

With reference to FIG. 7, the data line DL is located within the first segment 1111 and close to a left side of the first segment 1111. A distance between an edge of the data line DL on the left side and an edge of the first segment 1111 on the left side is less than a distance between an edge of the data line DL on the right side and an edge of the first segment 1111 on the right side.

Optionally, any two of the pixel electrode 121, the data line DL and the first line segment 1111 overlap with each other. For example, with reference to FIG. 8, an edge of the pixel electrode 121 on the left side is located on a left side of the edge of the data line DL on the right side and on a right side of the edge of the data line DL on the left side.

In some specific embodiments, in an overlapping region of the data line DL and the first line segment 1111, a distance d1 between the first edge 1111a of the first line segment 1111 and the third edge DLa of the data line DL is less than a dimension d3 of the data line DL in the first direction X. A distance between the second edge 1111b of the first line segment 1111 and the fourth edge DLb of the data line DL is greater than the dimension d3 of the data line DL in the first direction X. For example, a width of the data line DL may be set to 6 μm. A distance between the left edge of the first line segment 1111 and the left edge of the data line DL may be set to 2.3 μm.

It should be noted that in embodiments of the present disclosures, the distance may refer to an average distance or a minimum distance, and the width may refer to an average width or a minimum width.

In some specific embodiments, the display substrate includes a plurality of sub-pixels PX. Each sub-pixel PX includes a switching transistor T. The plurality of switching transistors T are arranged in an array in the first direction X and the second direction Y. An orthographic projection of at least one first line segment 111 on the first base substrate 101 is located between orthographic projections of two adjacent switching transistors T in the second direction Y on the first base substrate 101. For example, at least one column of switching transistors T are electrically connected to the data line DL, and an orthographic projection of at least one first line segment 1111 on the first base substrate 101 is located between orthographic projections of two adjacent switching transistors T in the column of switching transistors T on the first base substrate 101. In other words, in embodiments of the present disclosure, the first line segment 1111 may refer to a portion of the first common signal line 111 located between two adjacent switching transistors T in the second direction Y.

The first common signal line 111 may be shared by two adjacent transparent conductive portions D. For the first line segment 1111, the first line segment 1111 may be used to form two transparent conductive portions D arranged in the first direction X. For example, with reference to FIG. 7 and FIG. 8, a right side of the first line segment 1111 may be used to form a transparent conductive portion D shown in the figure, and a left side of the first line segment 1111 may be used to form a transparent conductive portion (not shown in the figure, but the structure of the transparent conductive portion is substantially the same as the transparent conductive portion D shown in the figure) on a left side of the transparent conductive portion D shown in the figure.

In embodiments of the present disclosure, by minimizing the distance between the first edge 1111a of the first line segment 1111 and the third edge DLa of the data line DL, a capacitance of a non-overlapping region of the data line DL and the first common signal line 111 may be reduced, thereby reducing the load on the signal line and reducing power consumption.

Figure 9:
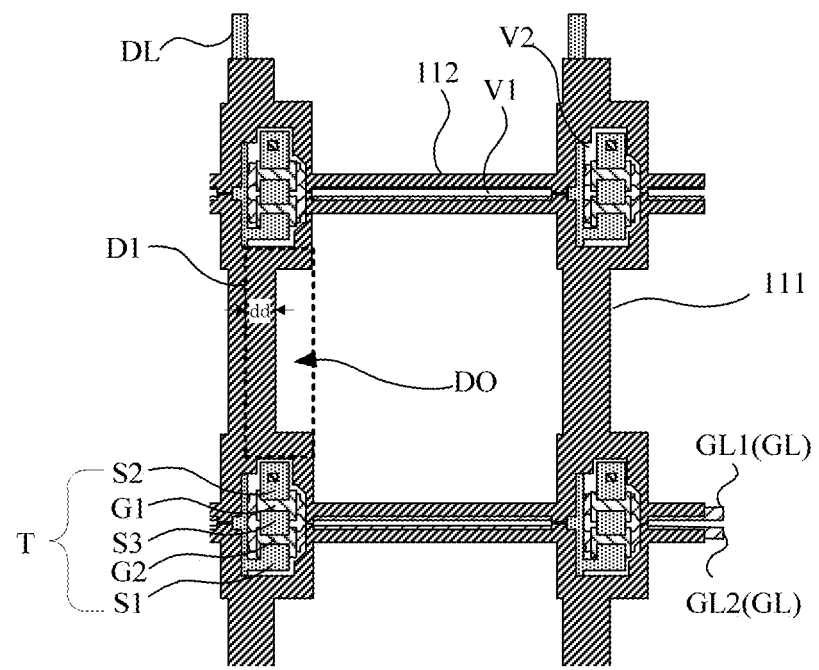
FIG. 9 schematically shows a schematic diagram of an adjustment portion according to embodiments of the present disclosure.
Figure 10:
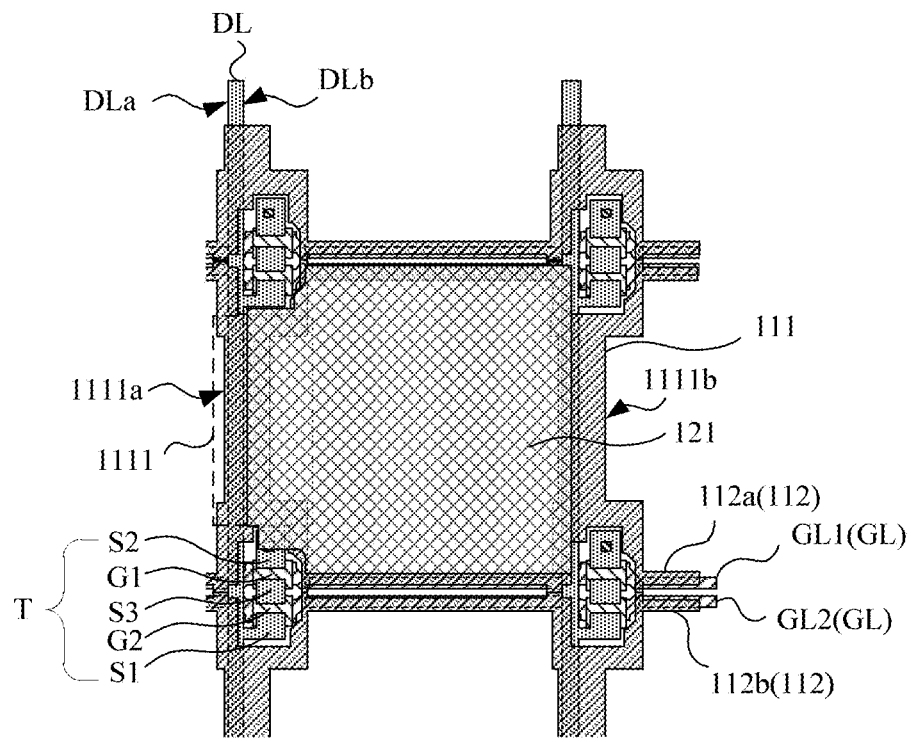
FIG. 10 schematically shows a schematic diagram of a pixel electrode overlapping with a first line segment according to embodiments of the present disclosure.

FIG. 9 schematically shows a schematic diagram of an adjustment portion according to embodiments of the present disclosure. FIG. 10 schematically shows a schematic diagram of a pixel electrode overlapping with a first line segment according to embodiments of the present disclosure. With reference to FIG. 9 and FIG. 10, in some specific embodiments, in the thickness direction of the display substrate, the at least one first line segment 1111 overlaps with an edge of the pixel electrode 121 (such as the left edge of the pixel electrode 121) on a side of the pixel electrode 121 facing the data line DL, and an overlapping portion of the at least one first line segment and the edge of the pixel electrode forms an adjustment portion D1 of the transparent conductive portion D, and a dimension dd of the adjustment portion D1 in the first direction X is positively correlated with a capacitance value of the storage capacitor Cst.

By setting the distance between the second edge 1111b of the first line segment 1111 and the fourth edge DLb of the data line DL to be larger, in addition to occupying the pixel opening region as little as possible, when the first common signal line 111 surrounds the switching transistor T, it is also possible to reduce a resistance of a surrounding portion of the first common signal line 111. This is beneficial for improving the problem of voltage dropping on the first common signal line 111, thereby improving uniformity.

Specifically, in embodiments of the present disclosure, the data line DL is disposed adjacent to the switching transistor T electrically connected to the data line DL. For example, with reference to FIG. 4, the switching transistor T is located on the right side of the data line DL electrically connected to the switching transistor T.

In embodiments of the present disclosure, the switching transistor T and surroundings of the switching transistor T may be disposed in a non-display region of the sub-pixel PX (for example, which may be obscured by a structure such as black matrix). Therefore, in embodiments of the present disclosure, a portion of the first line segment 1111 in the non-display region and a region of a connection line of the first line segment 1111 serves as an adjustment portion D1 of the transparent conductive portion D, so as to adjust an overlapping area, thereby minimizing the influence (or involvement) of a dimension adjustment space of the transparent conductive portion D on the pixel opening region of the sub-pixel PX, and reducing the impact of the dimension adjustment of the transparent conductive portion D on the aperture ratio of the pixel.

Optionally, the adjustment portion D1 includes two end portions arranged in the second direction Y and a recessed portion DO located between the two end portions. A dimension of the recessed portion DO in the first direction X is less than dimensions of the two end portions in the first direction X. In this way, a width of a portion of the adjustment portion D1 close to the switching transistor T is greater than a width of a portion of the adjustment portion D1 far away from the switching transistor T, thereby improving the aperture ratio of the pixel.

In some specific embodiments, the display substrate further includes a data line DL, a first gate line GL1 and a second gate line GL2 located on the first base substrate 101 and electrically connected to the sub-pixel PX. The N second common signal lines 112, the first gate line GL1 and the second gate line GL2 extend in the first direction. That is to say, the switching transistor T in this embodiment of the present disclosure adopts a dual gate design, and two gates of the switching transistor T are connected to two gate lines.

In embodiments of the present disclosure, the plurality of gate lines GL on the display substrate may be divided into a plurality of sets of gate lines. The plurality of sets of gate lines are arranged in the second direction Y. At least one set of gate lines is electrically connected to at least one row of sub-pixels PX. Different sets of gate lines are electrically connected to different rows of sub-pixels PX. Each set of gate lines includes two gate lines arranged in the second direction Y, that is, the first gate line GL1 and the second gate line GL2.

Figure 11:
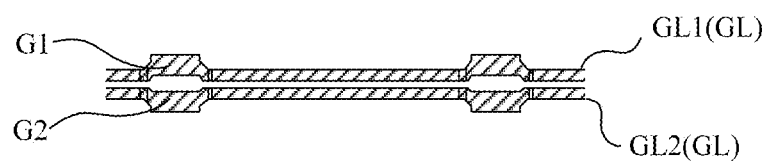
FIG. 11 schematically shows a plan view of a gate layer according to embodiments of the present disclosure.
Figure 11:
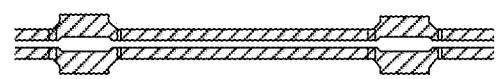
Figure 12:
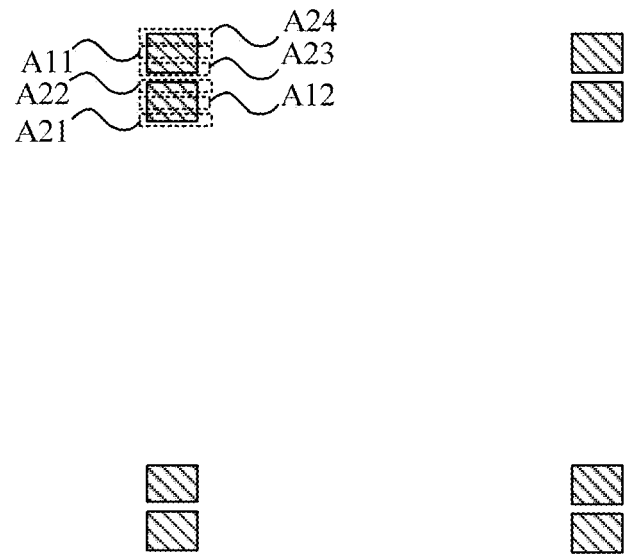
FIG. 12 schematically shows a plan view of an active layer according to embodiments of the present disclosure.
Figure 13:
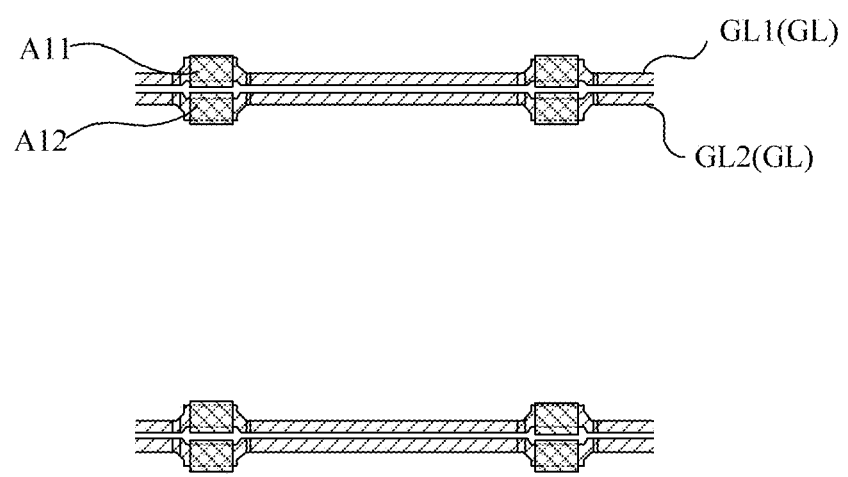
FIG. 13 schematically shows a plan view of a gate layer and an active layer according to embodiments of the present disclosure.
Figure 14:
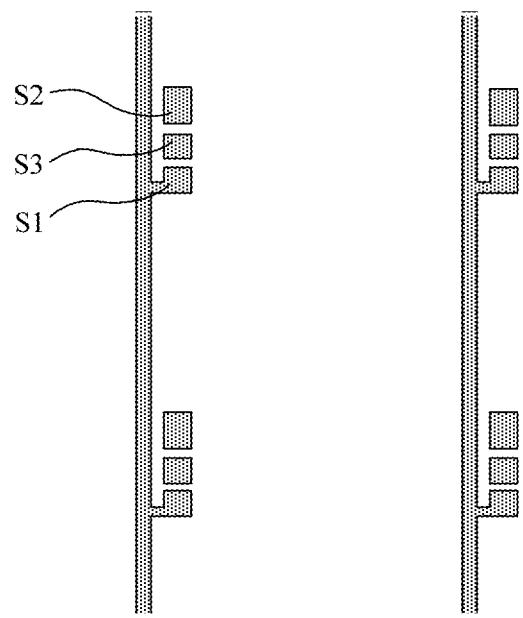
FIG. 14 schematically shows a plan view of a source and drain electrode layer according to embodiments of the present disclosure.
Figure 15:
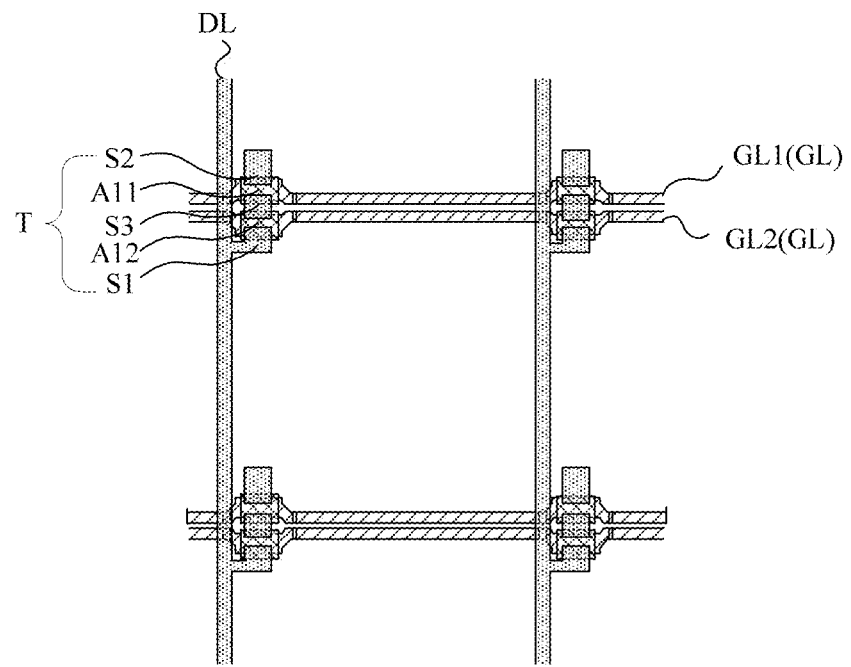
FIG. 15 schematically shows a plan view of a gate layer, an active layer and a source and drain electrode layer according to embodiments of the present disclosure.

FIG. 11 schematically shows a plan view of a gate layer according to embodiments of the present disclosure. FIG. 12 schematically shows a plan view of an active layer according to embodiments of the present disclosure. FIG. 13 schematically shows a plan view of a gate layer and an active layer according to embodiments of the present disclosure. FIG. 14 schematically shows a plan view of a source and drain electrode layer according to embodiments of the present disclosure. FIG. 15 schematically shows a gate layer, an active layer and a source and drain electrode layer according to embodiments of the present disclosure.

With reference to FIG. 11 to FIG. 15, the sub-pixel PX includes a switching transistor T. The switching transistor T includes a first electrode S1, a second electrode S2, a first gate G1 and a second gate G2. The first electrode S1 is electrically connected to the data line DL, the second electrode S2 is electrically connected to the pixel electrode 121, the first gate G1 is electrically connected to the first gate line GL1, and the second gate G2 is electrically connected to the second gate line GL2. In the thickness direction of the display substrate, at least one second common signal line 112 overlaps with the first gate line GL1 and the second gate line GL2.

In embodiments of the present disclosure, the first gate line GL1 and the second gate line GL2 extend in the first direction X, and the first gate line GL1 and the second gate line GL2 are parallel to each other and separated by insulation. Therefore, for the switching transistor T, when both gate lines GL electrically connected to the switching transistor T provide valid level signals, the switching transistor T is turned on.

In embodiments of the present disclosure, at least one second common signal line 112 corresponds to at least one set of gate lines, and different second common signal lines 112 correspond to different sets of gate lines. In the thickness direction of the display substrate, the second common signal line 112 overlaps with the first gate line GL1 and the second gate line GL2 in the set of gate lines corresponding to the second common signal line 112. For example, with reference to FIG. 6, the second common signal line 112, the first gate line GL1 and the second gate line GL2 are arranged in parallel. An upper half portion of the second common signal line 112 overlaps with the first gate line GL1, and a lower half portion of the second common signal line 112 overlaps with the second gate line GL2.

In embodiments of the present disclosure, the first gate line GL1 and the first gate G1 of the switching transistor T may form an integrated structure, the second gate line GL2 and the second gate G2 of the switching transistor T may form an integrated structure, and the first electrode S1 of the switching transistor T and the data line DL may form an integrated structure. The first gate G1 of the switching transistor T and the second gate G2 of the switching transistor T may be arranged in the second direction Y.

In some specific embodiments, the display substrate further includes an active layer ACT located on a side of the first transparent electrode layer 110 facing the first base substrate 101. The active layer ACT may include semiconductor materials such as a-Si, LTPS, and LTPO.

The switching transistor T further includes a first channel portion A11 and a second channel portion A12 located in the active layer ACT. An orthographic projection of the first channel portion A11 on the first base substrate 101 at least partially overlaps with an orthographic projection of the first gate G1 on the first base substrate 101, and an orthographic projection of the second channel portion A12 on the first base substrate 101 at least partially overlaps with an orthographic projection of the second gate G2 on the first base substrate 101. An aspect ratio of any one of the first channel portion and the second channel portion is less than 4.

Optionally, a ratio of a channel width of any one of the first channel portion A11 and the second channel portion A12 to a sum of a channel length of the first channel portion A11 and a channel length of the second channel portion A12 is less than or equal to 2.

When the switching transistor T is turned off, the ideal situation is that a resistance of the switching transistor T in the turn-off state is infinitely large, and there is no charge leakage from the storage capacitor Cst through the switching transistor T. However, in an actual case, the resistance of the switching transistor T in the turn-off state is not infinitely large. According to the leakage current expression, it may be inferred that, in a case that other parameters such as film thickness remain unchanged, the leakage current decreases with the increase of a channel length L of the switching transistor T. In embodiments of the present disclosure, the channel length of the switching transistor T is extended, thereby reducing the leakage current, and the smaller the leakage current is, the lower the power consumption of the display substrate is.

In some specific embodiments, a channel length of the first channel portion A11 and a channel length of the second channel portion A12 are substantially equal to each other. For example, a channel width of any one of the first channel portion A11 and the second channel portion A12 is set to 17.5 μm, and the channel length of any one of the first channel portion A11 and the second channel portion A12 is set to 5 μm. The channel length is 4 μm greater than a channel length of a switching transistor in an existing display substrate. The sum of the channel lengths of the first channel portion A11 and the second channel portion A12 is much greater than the channel length of the switching transistor in an existing display substrate, thereby greatly avoiding the problem of leakage current.

In embodiments of the present disclosure, the display substrate further includes a gate layer GT, a gate insulation layer GI, a source and drain electrode layer SD, and a second insulation layer PVX2 arranged in a direction away from the first base substrate 101. The active layer ACT is located between the gate insulation layer GI and the source and drain electrode layer SD. A first electrode S1 of the switching transistor T and a second electrode S2 of the switching transistor T are located in the source and drain electrode layer SD. The first gate line GL1, the second gate line GL2, and the first gate G1 and the second gate G2 of the switching transistor T are located in the gate layer GT. The switch transistor T with this structure is also referred to as a bottom gate structure. It should be noted that in embodiments of the present disclosure, the bottom gate structure is taken as an example for illustration, but this does not constitute a limitation on the switching transistor T in embodiments of the present disclosure. For example, the switching transistor T in embodiments of the present disclosure may also adopt a top gate structure.

In some specific embodiments, the first insulation layer PVX1 and the second insulation layer PVX2 may be synchronously etched, thereby saving one patterning process.

In embodiments of the present disclosure, a connection via hole H1 is provided on the second insulation layer PVX2, and the pixel electrode 121 is electrically connected to the second electrode S2 of the switching transistor T through the connection via hole H1.

The switching transistor T further includes a first connection portion A21, a first connection portion A22, a third connection portion A23 and a fourth connection portion A24 in the active layer ACT; and a bridging portion S3 in the source and drain electrode layer SD. The second channel portion A12 is located between the first connection portion A21 and the first connection portion A22, and the first channel portion A11 is located between the third connection portion A23 and the fourth connection portion A24. The first connection portion A21 is electrically connected to the first electrode S1 of the switching transistor T, and the fourth connection portion A24 is electrically connected to the second electrode S2 of the switching transistor T. The first connection portion A22 and the third connection portion A23 are electrically connected through the bridging portion S3.

In embodiments of the present disclosure, an orthographic projection of at least one of the first gate G1 and the second gate G2 on the first base substrate 101 may have an "I" shape, a "U" shape or an "L" shape, which may be determined based on actual desires, and there are no limitations here.

In embodiments of the present disclosure, in the second direction Y, the first connection portion A21, the second channel portion A12, the first connection portion A22, the third connection portion A23, the first channel portion A11, and the fourth connection portion A24 are arranged in sequence. For example, orthographic projections of the first connection portion A21, the first channel portion A11, the first connection portion A22, the third connection portion A23, the second channel portion A12, and the fourth connection portion A24 on the first base substrate 101 may have an "I" shape.

The first gate line GL1 is bended in a direction away from the second gate line GL2, and is electrically connected to the first gate G1 of the switching transistor T at a bended position. The second gate line GL2 is bended in a direction away from the first gate line GL1, and is electrically connected to the second gate G2 of the switching transistor T at a bended position. For example, with reference to FIG. 7, the first gate line GL1 is bended upwards and the second gate line GL2 is bended downwards, which is beneficial for making space for disposing the bridging portion S3, thereby achieving the dual gate design of the switching transistor T.

In some specific embodiments, the power consumption may be reduced by reducing the refresh frequency of the screen, and the specific refresh frequency may be determined according to actual desires. For example, in quasi-static display scenes (such as electronic price tags in supermarkets and outdoor billboards, etc.), a refresh frequency of 1 Hz (hereinafter referred to as low-frequency driving) may be selected. Optionally, other lower refresh frequencies may also be used. Compared to a refresh frequency of 60 Hz, the refresh frequency of 1 Hz consumes less power. The display process is divided into a data writing phase and a display phase in terms of time. In the data writing phase, a data signal is written, and in the display phase, a negative bias voltage is applied to the switching transistor T to ensure that the switching transistor T is not turned on in the display phase. When driving at low frequencies, the same bias voltage may be applied to the switching transistor T for a long time, which may easily lead to threshold voltage drift of the switching transistor T and other problems. Therefore, this problem may be alleviated by using the following methods in embodiments of the present disclosure.

In embodiments of the present disclosure, the switching transistor T adopts the dual gate design as described above, the dual gate switching transistor may be equivalent to two transistors connected in series, hereinafter referred to as a first transistor M1 and a second transistor M2. A gate of the first transistor M1 is the first gate G1 described above, and a gate of the second transistor M2 is the second gate G2 described above.

Figure 16:
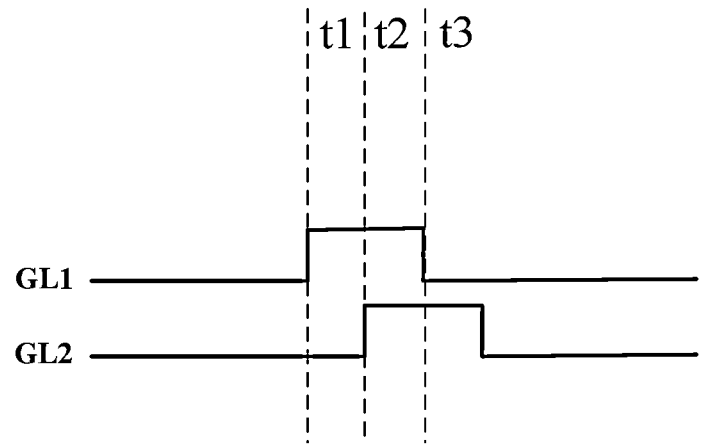
FIG. 16 schematically shows a first driving timing diagram according to embodiments of the present disclosure.

FIG. 16 schematically shows a first driving timing diagram according to embodiments of the present disclosure. With reference to FIG. 16, in a first data writing phase t1, a valid level signal is provided to the first gate line GL1, and an invalid level signal is provided to the second gate line GL2. The first transistor M1 is turned on and the second transistor M2 is turned off, therefore, the switching transistor T is in a turned-off state as a whole.

In a second data writing phase t2, a valid level signal is provided to the first gate line GL1, and a valid level signal is provided to the second gate line GL2. The first transistor M1 is turned on, and the second transistor M2 is also turned on. Therefore, the switching transistor T is in a turned-on state as a whole, and the storage capacitor Cst starts to be charged.

In a display phase t3, an invalid level signal is provided to the first gate line GL1, and a valid level signal is provided to the second gate line GL2. The first transistor M1 is turned off, while the second transistor M2 is turned on. Therefore, the switching transistor T is in a turned-off state as a whole, and the storage capacitor Cst is fully charged and continuously provides a driving voltage.

Therefore, on a basis of ensuring the switching transistor T to be turned off, embodiments of the present disclosure prolongs the time length for applying positive bias voltages to the first transistor M1 and the second transistor M2, and correspondingly shortens the time length for applying negative bias voltage, thereby alleviating the problem of threshold voltage drift caused by applying the same bias voltage to the transistor for a long time.

When driving at low frequencies, it is required that the storage capacitor Cst may maintain the voltage at two ends of the capacitor for a long time to maintain the screen unchanged until the next frame arrives. Therefore, the charging time length of the storage capacitor Cst may also be extended. Therefore, it is required to adjust a value of the storage capacitor Cst to match the charging time length. In some specific embodiments, an overlapping area of the transparent conductive portion D and the pixel electrode 121 is increased by improving a width of the first portion D1 of the transparent conductive portion D, thereby increasing the storage capacitance Cst; or the dimensions of the transparent conductive portion D and the pixel electrode 121 in the thickness direction of display substrate may be reduced, for example, a thickness of the second insulation layer PVX2 between the transparent conductive portion D and the pixel electrode 121 may be reduced, so as to increase the storage capacitance Cst.

Figure 17:
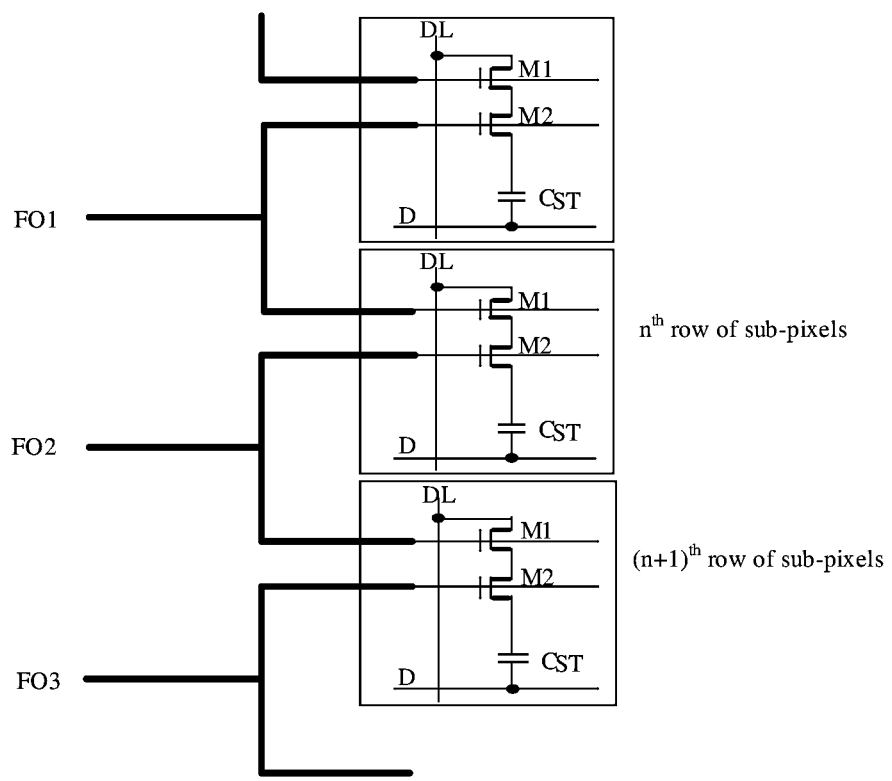
FIG. 17 schematically shows a schematic diagram of a gate line electrically connected to a scanning signal terminal according to embodiments of the present disclosure.

FIG. 17 schematically shows a schematic diagram of a gate line electrically connected to a scanning signal terminal according to embodiments of the present disclosure. With reference to FIG. 17, in some specific embodiments, the display substrate includes a plurality of sub-pixels PX arranged in an array in a second direction Y and a first direction X. A second gate line GL2 electrically connected to a second gate G2 of a switching transistor T of an $n^{th}$ row of sub-pixels PX and a first gate line GL1 electrically connected to a first gate G1 of a switching transistor T of an $(n+1)^{th}$ row of sub-pixels PX are electrically connected to a same scanning signal terminal, where n is a positive integer. In this way, the first gate line GL1 and the previous second gate line GL2 may be loaded with a same electrical signal. In this way, valid level signals output by two adjacent scanning signal terminals may be staggered to achieve scanning row by row, which may also be referred to as De-stress. Compared to connecting the first gate line GL1 and the second gate line GL2 separately to the scanning signal terminal, this method may reduce the scanning frequency.

Optionally, when a duration of the valid level signal at the previous scanning signal terminal reaches half of a desired duration, the next scanning signal terminal outputs a valid level signal. In other words, a duration of the first data writing phase t1 and a duration of the second data writing stage t2 may be equal to each other.

Figure 18:
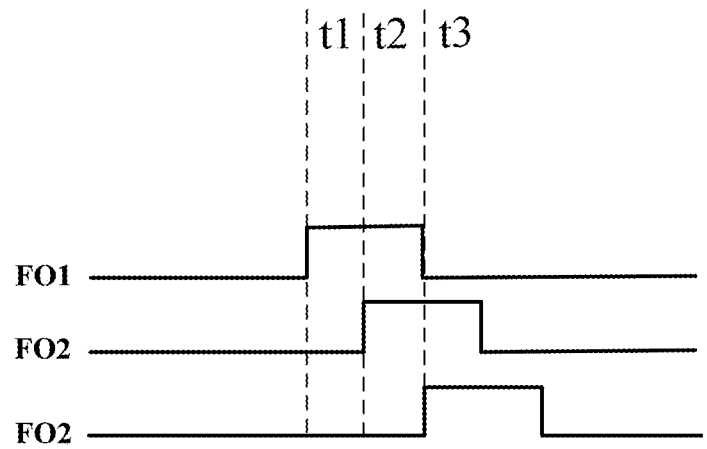
FIG. 18 schematically shows a second driving timing diagram according to embodiments of the present disclosure.

FIG. 18 schematically shows a second driving timing diagram according to embodiments of the present disclosure. With reference to FIG. 17 and FIG. 18, in a first data writing phase t1 of the $n^{th}$ row of sub-pixels, a scanning signal terminal FO1 provides a valid level signal to the first gate line GL1 electrically connected to the scanning signal terminal FO1, and a scanning signal terminal FO2 provides an invalid level signal to the second gate line GL2 electrically connected to the scanning signal terminal FO2.

In a second data writing phase t2 of the $n^{th}$ row of sub-pixels, the scanning signal terminal FO1 provides a valid level signal to the first gate line GL1 electrically connected to the scanning signal terminal FO1, and the scanning signal terminal FO2 provides a valid level signal to the second gate line GL2 electrically connected to the scanning signal terminal FO2. As the second gate line GL2 electrically connected to the $n^{th}$ row of sub-pixels and the first gate line GL1 electrically connected to the $(n+1)^{th}$ row of sub-pixels PX are electrically connected to the scanning signal terminal FO2, the scanning signal terminal FO2 provides a valid level signal to the first gate line GL1 electrically connected to the $(n+1)^{th}$ row of sub-pixels PX. That is to say, the $(n+1)^{th}$ row of sub-pixels PX is at the first data writing phase T1 at this time.

In a display phase t3 of the $n^{th}$ row of sub-pixels, the scanning signal terminal FO1 provides an invalid level signal to the first gate line GL1 electrically connected to the scanning signal terminal FO1, and the scanning signal terminal FO2 provides a valid level signal to the second gate line GL2 electrically connected to the scanning signal terminal FO2. As the second gate line GL2 electrically connected to the $n^{th}$ row of sub-pixels and the first gate line GL1 electrically connected to the $(n+1)^{th}$ row of sub-pixels PX are electrically connected to the scanning signal terminal FO2, the scanning signal terminal FO2 also provides a valid level signal to the first gate line GL1 electrically connected to the $(n+1)^{th}$ row of sub-pixels PX, and the scanning signal terminal FO3 provides a valid level signal to the second gate line GL2 electrically connected to the $(n+1)^{th}$ row of sub-pixels PX. That is to say, the $(n+1)^{th}$ row of sub-pixels PX are in the second data writing phase t2 at this time. And so on, the scanning row by row is achieved.

Figure 19:
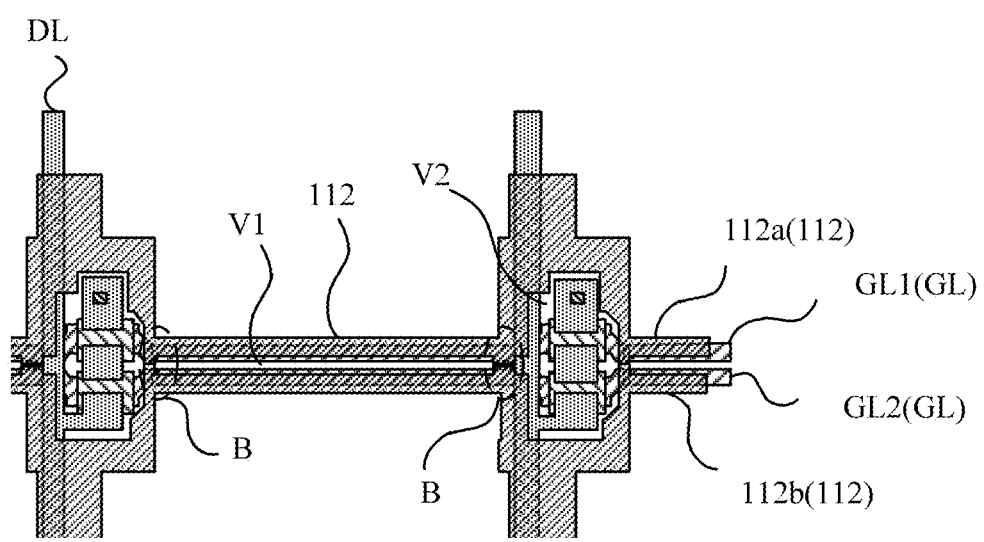
FIG. 19 schematically shows a plan view of a first hollow portion and a second hollow portion according to embodiments of the present disclosure.
Figure 20:
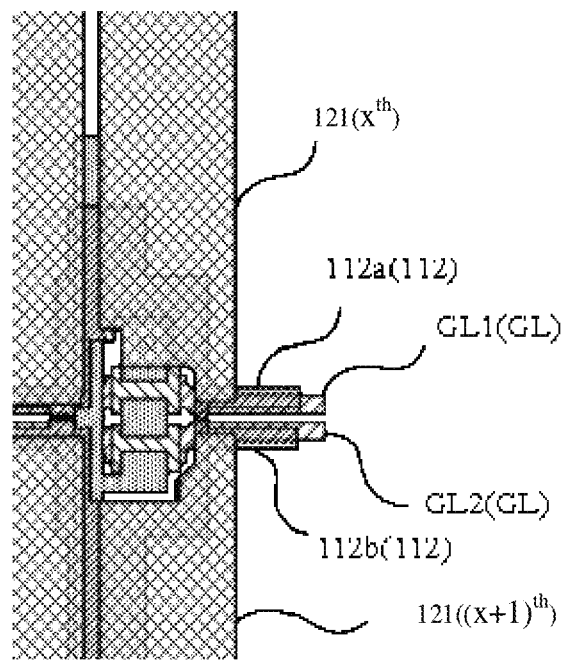
FIG. 20 schematically shows a plan view of a first hollow portion overlapping with a first gate line and a second gate line according to embodiments of the present disclosure.
Figure 21:
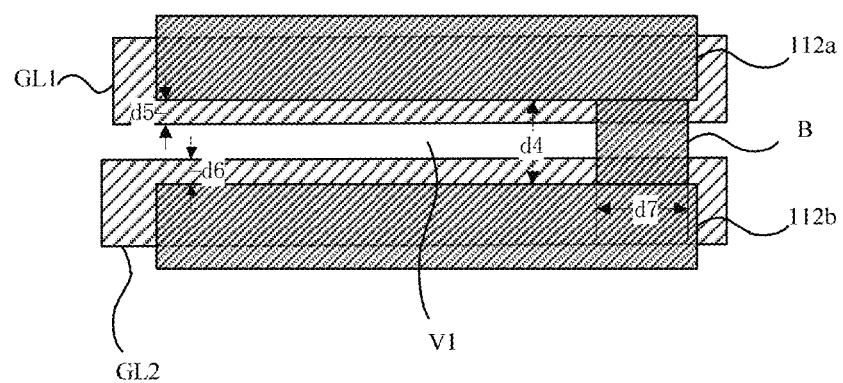
FIG. 21 schematically shows a schematic diagram of a dimensions of overlapping portions of a first hollow portion as well as a first gate line and a second gate line according to embodiments of the present disclosure.

FIG. 19 schematically shows a plan view of a first hollow portion and a second hollow portion according to embodiments of the present disclosure. FIG. 20 schematically shows a plan view of a first hollow portion overlapping with a first gate line and a second gate line according to embodiments of the present disclosure. FIG. 21 schematically shows a schematic diagram of dimensions of overlapping portions of a first hollow portion and a first gate line and a second gate line according to embodiments of the present disclosure.

With reference to FIG. 9, FIG. 10, FIG. 19 to FIG. 21, in some specific embodiments, at least one second common signal line 112 is provided with a first hollow portion V1. In the thickness direction of the display substrate, the first hollow portion V1 overlaps with the first gate line GL1 and the second gate line GL2.

In embodiments of the present disclosure, the first hollow portion V1 extends in the second direction Y. For example, the first hollow portion V1 is parallel to at least one of the second common signal line 112, the first gate line GL1, or the second gate line GL2. The first hollow portion V1 is used to reduce an overlapping area of the second common signal line 112 as well as the first gate line GL1 and the second gate line GL2, thereby reducing a parasitic capacitance between the second common signal line 112 and the gate lines GLs. As a result, the load on the signal line may be reduced, thereby reducing power consumption.

In some specific embodiments, an overlapping dimension d5 between the first hollow portion V1 and the first gate line GL1 in the second direction Y and an overlapping dimension d6 between the first hollow portion V1 and the second gate line GL2 in the second direction Y are less than a dimension d3 of the data line DL in the first direction X (also referred to as the width of the data line DL in this embodiment of the present disclosure). For example, the overlapping dimension d5 between the first hollow portion V1 and the first gate line GL1 in the second direction Y and the overlapping dimension d6 between the first hollow portion V1 and the second gate line GL2 in the second direction Y are equal to each other. A width of the first gate line GL1 and a dimension of the second gate line GL2 in the second direction Y are equal to each other. In this way, a width of the first hollow portion V1 meets a minimum wrapping value of the first hollow portion V1 overlapping with the first gate line GL1 and the second gate line GL2. The wrapping value may refer to the value range set to ensure that the first hollow portion V1, the first gate line GL1 and the second gate line GL2 are not affected by process fluctuations (such as process fluctuations causing certain regions to overlap and certain regions not to overlap).

In some specific embodiments, an orthographic projection of the first hollow portion V1 on the first base substrate 101 includes a strip-shaped structure extending in the second direction Y. A dimension d4 of the first hollow portion V1 in the second direction Y (also referred to as a width of the first hollow portion V1 in this embodiment of the present disclosure) is greater than or equal to the dimension d3 of the data line DL in the first direction X. For example, the dimension d4 of the first hollow portion V1 in the second direction Y is set to 6 μm. The dimension d3 of the data line DL in the first direction X may be set to 6 μm. In this way, the width of the first hollow portion V1 meets the exposure accuracy and the minimum wrapping value of the first hollow portion V1 overlapping the first gate line GL1 and the second gate line GL2, and the first hollow portion V1 is not too wide to cause the first sub-line 112a and the second sub-line 112b to be too thin, thereby avoiding the problem of excessive resistance of the first sub-line 112a and the second sub-line 112b.

For example, with reference to FIG. 21, an upper edge of the first hollow portion V1 overlaps with the first gate line GL1, and a lower edge of the first hollow portion V1 overlaps with the second gate line GL2.

In some specific embodiments, at least one second common signal line 112 includes a first sub-line 112a and a second sub-line 112b arranged in the second direction Y, and the first hollow portion V1 separates the first sub-line 112a and the second sub-line 112b. In the thickness direction of the display substrate, the first sub-line 112a of the at least one second common signal line 112 at least partially overlaps with the first gate line GL1, and the second sub-line 112b of the at least one second common signal line 112 at least partially overlaps with the second gate line GL2.

For example, an upper edge of the first sub-line 112a is located above an upper edge of the first gate line GL1, and a lower edge of the first sub-line 112a is located above a lower edge of the first gate line GL1. A region in which the two do not overlap with each other is also the region in which the first hollow portion V1 is located.

For example, an upper edge of the second sub-line 112b is located below an upper edge of the second gate line GL2, and a lower edge of the first sub-line 112a is located below a lower edge of the second gate line GL2. The region in which the two do not overlap with each other is also the region in which the first hollow portion V1 is located.

In some specific embodiments, a light transmittance of the first transparent electrode layer 110 is substantially identical to a light transmittance of the second transparent electrode layer 120. For example, the two include indium tin oxide, and the light transmittance of the two is approximately 90%.

With reference to FIG. 20, in some specific embodiments, the display substrate includes a plurality of sub-pixels PX. In the thickness direction of the display substrate, the first gate line GL1 and the second gate line GL2 electrically connected to the same sub-pixel PX overlap with pixel electrodes 121 of two adjacent sub-pixels PX in the second direction Y, respectively.

For example, for a first gate line GL1 and a second gate line GL2 connected to an $x^{th}$ sub-pixel PX, in the thickness direction of the display substrate, a pixel electrode 121 of the $x^{th}$ sub-pixel PX overlaps with the first gate line GL1, and an orthographic projection of an overlapping portion of the pixel electrode of the $x^{th}$ sub-pixel and the first gate line GL1 on the first base substrate 101 defines a first region. A pixel electrode 121 of an $(x+1)^{th}$ sub-pixel PX overlaps with the second gate line GL2, and an orthographic projection of an overlapping portion of the pixel electrode 121 of the $(x+1)^{th}$ sub-pixel and the second gate line GL2 on the first base substrate 101 defines a second region. An orthographic projection of the first sub-line 112a of the at least one second common signal line 112 on the first base substrate 101 at least partially overlaps with the first region, and an orthographic projection of the second sub-line 112b of the at least one second common signal line 112 on the first base substrate 101 at least partially overlaps with the second region, where x is a positive integer. In this way, the first sub-line 112a may be located in the overlapping region of the first gate line GL1 and the pixel electrode 121, so as to at least partially shield the parasitic capacitance between the first gate line G1 and the pixel electrode 121. The second sub-line 112b is located in the overlapping region of the second gate line GL2 and the pixel electrode 121, so as to at least partially shield the parasitic capacitance between the second gate line G1 and the pixel electrode 121.

In some specific embodiments, the orthographic projection of the first sub-line 112a of the at least one second common signal line 112 on the first base substrate 101 covers the first region, and the orthographic projection of the second sub-line 112b of the at least one second common signal line 112 on the first base substrate 101 covers the second region. In this way, the first sub-line 112 may cover the overlapping region of the first gate line GL1 and the pixel electrode 121, so as to shield the parasitic capacitance between the first gate line G1 and the pixel electrode 121 to a greater extent. The second sub-line 112b covers the overlapping region of the second gate line GL2 and the pixel electrode 121, so as to shield the parasitic capacitance between the second gate line GL2 and the pixel electrode 121 to a greater extent.

For example, with reference to FIG. 20, for the first gate line GL1 and the second gate line GL2 electrically connected to the $x^{th}$ sub-pixel PX, an upper edge of the first gate line GL1 is located between an upper edge of the first sub-line 112a and a lower edge of the pixel electrode 121 of the $x^{th}$ sub-pixel PX. A lower edge of the first gate line GL1 is located on a side of a lower edge of the first sub-line 112a away from a lower edge of the pixel electrode 121 of the $x^{th}$ sub-pixel PX. An upper edge of the second gate line GL2 is located on a side of an upper edge of the second sub-line 112b away from the pixel electrode 121 of the $(x+1)^{th}$ sub-pixel PX (or facing the pixel electrode 121 of the $x^{th}$ sub-pixel PX), and a lower edge of the second gate line GL2 is located between a lower edge of the second sub-line 112b and an upper edge of the pixel electrode 121 of the $(x+1)^{th}$ sub-pixel PX.

With reference to FIG. 21, in some specific embodiments, the first sub-line 112a and the second sub-line 112b are electrically connected to each other through a connection bridge B located at at least one end of the first hollow portion V1. A dimension d7 of the connection bridge B in the second direction Y is greater than or equal to the dimension d3 of the data line DL in the first direction X. For example, the dimension d7 of the connection bridge B in the second direction Y may be within a range of 6 μm to 10 μm, for example, 6 μm. The dimension d3 of the data line DL in the first direction X may be within a range of 6 μm to 10 μm, for example, 6 μm.

Optionally, the dimension of the connection bridge B in the second direction Y and the dimension of the connection bridge B in the first direction X may be identical to each other.

Therefore, the connection bridge B may not only meet the exposure requirements of the minimum line width, but also maintain a certain width to reduce resistance appropriately, while an area of the connection bridge B is moderate, and an overlapping area between the connection bridge B and the first gate line GL1 and the second gate line GL2 is not too large, avoiding the problem of increasing signal line load caused by this.

In some specific embodiments, the connection bridge B does not overlap with the data line DL, and a distance between the connection bridge B and the data line DL in the first direction X is less than the width of the data line DL. A distance between the connection bridge B and data line DL in the second direction Y is within a range of 2.3 µm to 3 µm. Therefore, it is possible to cause the connection bridge B to avoid the data line DL, thereby avoiding increasing the load on the data line DL caused by the overlapping of the two.

Through at least one dimension design described above, on a basis of meeting the limitations of patterning accuracy (such as the line width of the wire (or opening) at least not being less than the minimum exposure accuracy), capacitances between the first common signal line 111 (or the second common signal line 121) and other wires are minimized as much as possible, thereby maximizing the reduction of wiring load, which is conducive to reducing display power consumption.

Not only that, through at least one dimension design described above, the first common signal line 111 and the second common signal line 121 may also meet the desired dimension wrapping relationship with other wires, thereby avoiding differences in overlapping relationships between various wires due to process fluctuations, which may lead to differences of the capacitances between the wires and affect display uniformity. For example, a portion of the data line DL (or the gate line GL) that should be covered by the first common signal line 111 (or the second common signal line 121) is exposed after the patterning process due to small reserved distance.

Optionally, dimensions of the two connection bridges B located at the left and the right ends of the first hollow portion V1 in the second direction Y are identical to each other, and the dimensions of the two in the first direction X may be the same or different, which may be determined according to actual desires and there is no limitation here.

In some specific embodiments, at least one second common signal line 112 is provided with a second hollow portion V2. An orthographic projection of the switching transistor T on the first base substrate 101 is located within an orthographic projection of the second hollow portion on the first base substrate 101. In embodiments of the present disclosure, the second hollow portion V2 specifically exposes the first channel portion and the second channel portion of the switching transistor T, thereby preventing an electrical signal on the second common signal line 112 from pulling the first channel portion and the second channel portion, thereby affecting characteristics of the switching transistor T.

In some specific embodiments, for maximizing the aperture ratio of the pixel while reducing the load, the methods such as reducing the line width, reducing the area of the pixel opening region occupied by the switching transistor T, and reducing the distance of wires may also be used.

The inventors found in the research that, in variable frequency driving, it is required to design larger pixel electrode to form larger storage capacitance to prevent the current from leaking when driving at low frequencies. However, additional parasitic capacitance may be generated between the larger pixel electrode and the gate line GL. When driving at high frequencies, additional parasitic capacitance generated between the pixel electrode and the gate line GL may prevent the charging of sub-pixels from achieving the optimal flip voltage of the liquid crystal. Specifically, the charging time length is closely related to the driving frequency and resolution. When the resolution is fixed, the charging time length is inversely proportional to the driving frequency. When the driving frequency is high, the charging time length is short, and there may be display abnormalities caused by insufficient charging. When the driving frequency is low, the charging time length is longer, the leakage current time length is also longer, and related defects such as leakage current may also occur.

In view of this, in embodiments of the present disclosure, the switching transistor T of the sub-pixel is improved, so as to reduce the leakage current of the switching transistor T of the sub-pixel, thereby alleviating the problem of the leakage current when driving at low frequencies. In embodiments of the present disclosure, the switching transistor T may adopt a dual gate design, but unlike that in embodiments described above, the two gates are arranged in an extension direction of the gate line and are electrically connected to a same gate line.

Specifically, in an ideal state, when the switching transistor T is turned off, there is no charge on the pixel storage capacitor Cst leaking through the switching transistor T, that is, no leakage current. However, there are always some leakage currents in reality, and when the leakage current is large, the pixel voltage may not be maintained. Particularly, when driving at low frequencies, the leakage time length is longer and the leakage current will increase. According to the leakage current expression, it may be inferred that, in a case that other parameters such as film thickness remain unchanged, the leakage current decreases with the increase of the channel length L. Therefore, in order to reduce the leakage current, a switching transistor T with a longer channel is selected in embodiments of the present disclosure.

Figure 22:
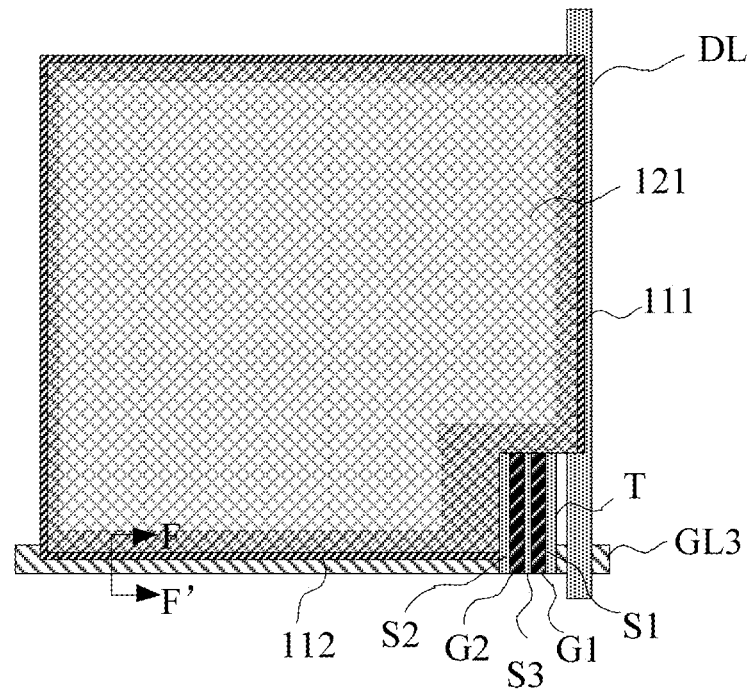
FIG. 22 schematically shows a plan view of a single gate line driving switching transistor in embodiments of the present disclosure.

FIG. 22 schematically shows a plan view of a single gate line driving switching transistor in embodiments of the present disclosure. With reference to FIG. 22, in some specific embodiments, the display substrate further includes a data line DL and a third gate line GL3 electrically connected to the sub-pixel PX on the first base substrate 101. The N second common signal lines 112 and the third gate line GL3 extend in the first direction X. The sub-pixel PX includes a switching transistor T. The switching transistor T includes a first electrode S1, a second electrode S2, a first gate G1 and a second gate G2. The first gate G1 and the second gate G2 are arranged in the first direction X. The first electrode S1 is electrically connected to the data line DL, the second electrode S2 is electrically connected to the pixel electrode 121, and the first gate G1 and the second gate G2 are electrically connected to the third gate line GL3. In the thickness direction of the display substrate, at least one second common signal line 112 overlaps with the third gate line GL3.

In other words, in embodiments of the present disclosure, the switching transistor T adopts a dual gate design. The two gates of the switching transistor T are arranged in an extension direction of the third gate line GL3, and the two gates are connected to a same third gate line G3. In this way, the switching transistor T is equivalent to two transistors M1 and M2 connected in series, with a longer equivalent channel length, which may alleviate the problem of high leakage current when driving at low frequencies.

Specifically, a leakage current $I_{ds}$ of the switching transistor T may be calculated using the following equation.

$$I_{ds} = \frac{W}{L} C \left[ (V_{ds} - V_{th}) V_{ds} - \frac{1}{2} V_{ds}^2 \right]$$

where W is a channel width of the switching transistor T, L is a channel length of the switching transistor T, C is a constant, $V_{ds}$ is a source and drain voltage of the switching transistor T, and $V_{th}$ is a threshold voltage of the switching transistor T.

Unlike the switching transistor T driven by dual gate lines, the switching transistor T driven by single gate line has fewer gate lines, which may reduce the impact on the aperture ratio of the pixel.

Figure 23:
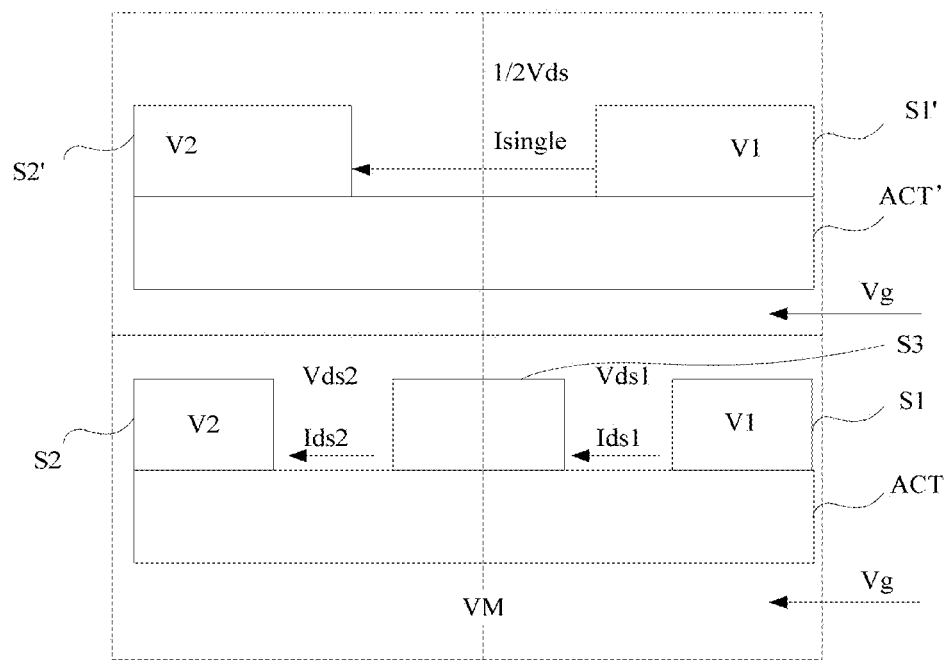
FIG. 23 schematically shows a cross-sectional view of a switching transistor in embodiments of the present disclosure and a cross-sectional view of a single gate transistor having a same channel length with the switching transistor in embodiments of the present disclosure.

FIG. 23 schematically shows a cross-sectional view of a switching transistor in embodiments of the present disclosure and a cross-sectional view of a single gate transistor having a same channel length with the switching transistor in embodiments of the present disclosure. With reference to FIG. 23, a lower figure is a schematic diagram of the switching transistor T in embodiments of the present disclosure, and an upper figure is a single gate transistor with the same channel length as the switching transistor T in embodiments of the present disclosure.

With reference to the lower figure in FIG. 23, when a voltage Vg on the third gate line is applied to the two gates of the switching transistor T, gate voltages on the two gates of the switching transistor T are not exactly the same. If a voltage at a midpoint of the two gates is Vm, a voltage V2 on the second electrode S2 is V2=Vg, and a voltage V1 on the second electrode S1 is V1=Vg−Vm<V2. As the transistor M1 and the transistor M2 are connected in series, a leakage current Ids1 of the transistor M1 and a leakage current Ids2 of the transistor M2 satisfy: Ids1=Ids2, a source and drain voltage Vds1 of the transistor M1 and a source and drain voltage Vds2 of the transistor M2 satisfy: Vds1<Vds2=½Vds, and a leakage current $I_{dual}$ of the switching transistor T meets: $I_{dual}$=Ids1.

With reference to the upper figure in FIG. 23, for a single gate transistor with the same channel length as the switching transistor T in embodiments of the present disclosure, the single gate transistor includes an active layer ACT', a first electrode S1' and a second electrode S2'. A gate voltage on a right half of the single gate transistor is equal to Vg, the source and drain voltage is approximately equal to ½Vds, and a leakage current of the single gate transistor is $I_{single}$, clearly, $I_{dual}$<$I_{single}$, that is, the leakage current of the dual gate switching transistor T in embodiments of the present disclosure is smaller.

Figure 24:
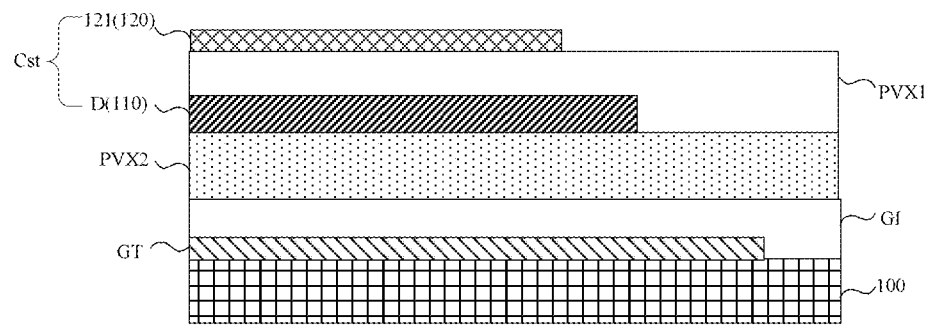
FIG. 24 is a schematic diagram of FIG. 22 taken along line FF'.

FIG. 24 is a schematic diagram of FIG. 22 taken along line FF'. With reference to FIG. 22 and FIG. 24, in some specific embodiments, in the thickness direction of the display substrate, the pixel electrode 121 overlaps with the third gate line GL3, and an orthographic projection of an overlapping portion of the pixel electrode 121 and the third gate line GL3 on the first base substrate 101 defines a third region. An orthographic projection of at least one second common signal line 112 on the first base substrate 101 at least partially overlaps with the third region. In this way, the second common signal line 112 may be located in the overlapping region of the third gate line GL3 and the pixel electrode 121, so as to at least partially shield a parasitic capacitance between the third gate line GL3 and the pixel electrode 121.

In some specific embodiments, the orthographic projection of at least one second common signal line 112 on the first base substrate 101 covers the third region. In this way, the second common signal line 112 may cover the overlapping region of the third gate line GL3 and the pixel electrode 121, so as to shield the parasitic capacitance between the third gate line GL3 and the pixel electrode 121 to a greater extent.

It should be noted that the second common signal line 112 of this embodiment extends into the overlapping region of the third gate line GL and the pixel electrode 121, and is located between the third gate line GL and the pixel electrode 121 in the thickness direction of the display substrate. Therefore, a degree of extension of the second common signal line 112 allows the storage capacitance Cst and the parasitic capacitance to be adjustable, which may meet the requirements of variable frequency driving in different ranges. For example, if an area of the sub-pixel PX is 201 μm*201 μm, an area of the pixel electrode 121 may be 197 μm*197 μm. At this point, a dimension of an orthographic projection of the second common signal line 112 on the pixel electrode 121 in the second direction Y may be set to 11 μm. The driving may be achieved when an upper limit of the frequency is 60 Hz. If it is desired to achieve variable frequency driving at a frequency with a higher upper limit, it is only required to increase the dimension of the orthographic projection of the second common signal line 112 on the pixel electrode 121 in the second direction Y. As the second common signal line 112 is a transparent signal line, the aperture ratio of the pixel may not be affected.

Optionally, the display substrate in embodiments of the present disclosure may support variable frequency driving with a frequency range from 15 Hz to 60 Hz. However, embodiments of the present disclosures may also meet the requirements of other variable frequency ranges by using different overlapping areas of the second common signal line 112, the third gate line GL and the pixel electrode 121.

Compared to existing solutions, embodiments of the present disclosure may achieve a larger storage capacitance Cst and a smaller parasitic capacitance between the gate line and the pixel electrode, and the values of the storage capacitance Cst and parasitic capacitance may be adjusted, so that the requirements of various driving frequencies may be adapted, so as to achieve variable frequency driving.

It should be noted that for the non-detailed explanations in embodiments of the present disclosure, reference may be made to embodiments in the previous descriptions (such as the second hollow portion, etc.), which will not be repeated here.

Figure 25:
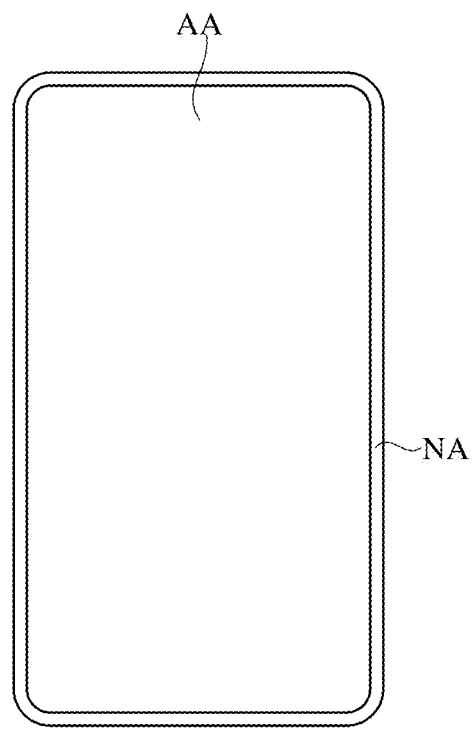
FIG. 25 schematically shows a schematic diagram of a display panel according to embodiments of the present disclosure.

At least some embodiments of the present disclosure further provide a display panel. FIG. 25 schematically shows a schematic diagram of a display panel according to embodiments of the present disclosure. With reference to FIG. 25, the display panel includes the display substrate as described above, which has a display region AA, a peripheral region NA and related structures thereof. For example, the display panel may be a liquid crystal display panel.

Figure 26:
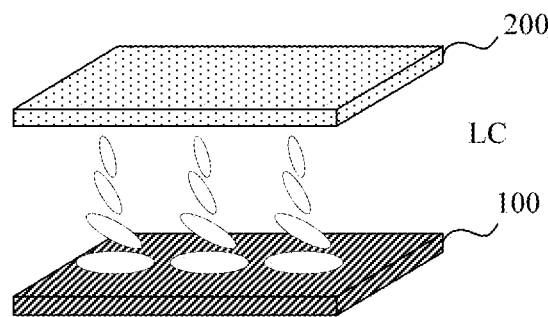
FIG. 26 schematically shows a Twisted Nematic type liquid crystal display panel according to embodiments of the present disclosure.

In some specific embodiments, the display panel includes a Twisted Nematic (TN) type liquid crystal display panel. FIG. 26 schematically shows a schematic diagram of a Twisted Nematic type liquid crystal display panel according to embodiments of the present disclosure. With reference to FIG. 26, in this embodiment, the display panel further includes a color filter substrate 200. The display substrate 100 is disposed opposite to the color filter substrate 200. The display panel further includes a liquid crystal layer LC between the display substrate and the color filter substrate 200.

Figure 27:
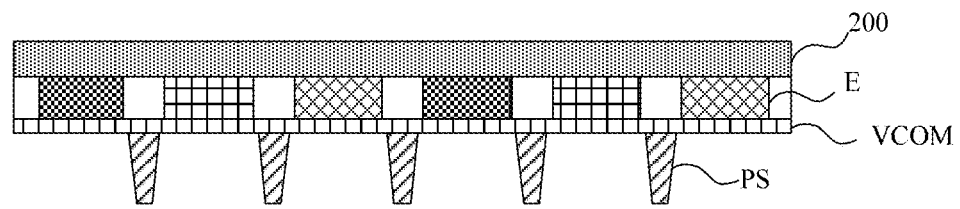
FIG. 27 schematically shows a schematic diagram of a color filter substrate according to embodiments of the present disclosure.

FIG. 27 schematically shows a schematic diagram of a color filter substrate according to embodiments of the present disclosure. With reference to FIG. 27, the color filter substrate 200 includes a second base substrate 201 and a common electrode VCOM on the second base substrate 201. The common electrode VCOM is electrically connected to the first common signal line 111 and the second common signal line 112 in the display substrate 100. The liquid crystal layer LC includes a plurality of liquid crystal molecules. The common electrode VCOM and the pixel electrode 121 on the display substrate 100 are configured such that: in response to a driving signal, an electric field driving a rotation of the liquid crystal molecules is formed. After passing through the liquid crystal layer LC, light enters a color filter layer E. Based on selective transmission characteristics of the color filter to the wavelength of light in the color filter layer E, corresponding color display may be achieved.

In some specific embodiments, the color filter substrate 200 further includes a spacer PS on a side of the common electrode VCOM away from the second base substrate 201. The spacer is used to support and maintain a cell gap of the liquid crystal layer LC.

In some specific embodiments, a ratio of a cell gap of the liquid crystal layer LC to a distance between the first transparent electrode layer 110 and the second transparent electrode layer 120 is greater than or equal to 20:1.

In embodiments of the present disclosure, the cell gap of the liquid crystal layer LC is much greater than a distance between the first transparent electrode layer 110 and the second transparent electrode layer 120. For example, the cell gap of the liquid crystal layer LC may be at a micrometer level, for example, the cell gap of the liquid crystal layer LC may be 4 μm. The distance between the first transparent electrode layer 110 and the second transparent electrode layer 120 may be at a nanometer level, for example, the cell gap of the liquid crystal layer LC may be set to 200 nm. Therefore, compared to the storage capacitance between the pixel electrode 121 and the transparent conductive portion D, a capacitor formed between the common electrode VCOM and the pixel electrode 121 (a difference between two capacitors may reach 20 times) may be ignored.

In some specific embodiments, the display substrate 100 and the color filter substrate 200 are bonded by a sealant in the peripheral region. The sealant includes a first conductive structure. A plurality of first common signal lines 111 and a plurality of second common signal lines 112 are electrically connected to the common electrode through the first conductive structure.

For example, the first common signal lines 111 and the second common signal lines 112 may intersect with each other to form a grid-like structure. The first common signal lines 111 and the second common signal lines 112 of the grid-like structure may extend to the peripheral region of the display panel and are electrically connected to the common electrode on the color filter substrate 200 through a conductive structure in the sealant, thereby providing a common voltage signal to the common electrode on the color filter substrate 200. For example, the conductive structure in the sealant may include a spherical metal structure.

In some other specific embodiments, the display panel may also include a display substrate in any one of an In-Plane Switching (IPS) type liquid crystal display panel, a Fringe Field Switching (FFS) type liquid crystal display panel, an Advanced Super Dimension Switch (ADS) type liquid crystal display panel, or a High Advanced Super Dimension Switch (HADS) type liquid crystal display panel.

At least some embodiments of the present disclosure further provide a display device. The display device may include any device or product with display function. For example, the display device may be a smartphone, a mobile phone, an e-book reader, a desktop computer (PC), a laptop PC, a netbook PC, a personal digital assistant (PDA), a portable multimedia player (PMP), a digital audio player, a mobile medical device, a camera, a wearable device (such as head-worn device, electronic clothing, electronic bracelet, electronic necklace, electronic accessory, or electronic tattoo, or smartwatch), or a television, etc.

Figure 28:
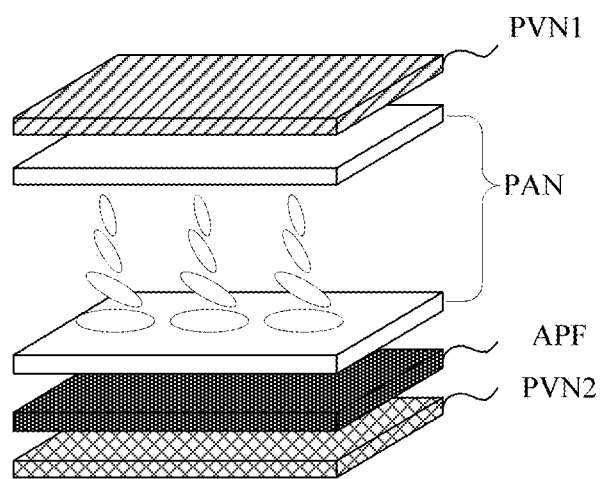
FIG. 28 schematically shows a schematic diagram of a display device according to embodiments of the present disclosure.

In embodiments of the present disclosure, the display device is a reflective display device. FIG. 28 schematically shows a schematic diagram of a display device according to embodiments of the present disclosure. With reference to FIG. 28, the reflective display device in the embodiment includes a first polarizer PVA1, a display panel PAN, a selective wavelength transmission film APF and a second polarizer PVA2. The display panel PAN is the display panel in above embodiments.

The first polarizer PVA1 has a first transmission axis and is used to generate a first polarized light with a polarization direction parallel to the first transmission axis. The second polarizer PVA2 has a second transmission axis and is used to generate a second polarized light with a polarization direction parallel to the second transmission axis. The selective wavelength transmission film APF is used to reflect the first polarized light and transmit the second polarized light.

For example, the first polarizer PVA1 is located on a light exit side of the display panel PAN, and the second polarizer PVA2 is located on a back side of the display panel PAN. The second transmission axis is perpendicular to the first transmission axis.

Figure 29:
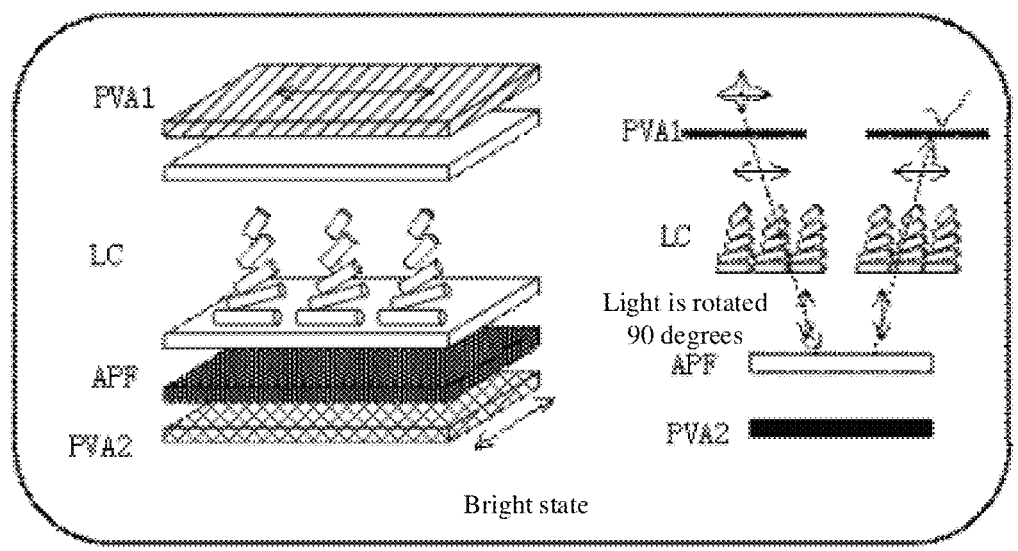
FIG. 29 schematically shows a schematic diagram of a display device in a bright state according to embodiments of the present disclosure.

FIG. 29 shows a schematic diagram of a display device in a bright state according to embodiments of the present disclosure. With reference to FIG. 29, an ambient light becomes a linearly polarized light after passing through the first polarizer PVA1, remains to be the linearly polarized light after passing through the unpowered display panel PAN, and then enters the selective wavelength transmission film APF. A polarization direction of the linearly polarized light is parallel to a transmission direction of the selective wavelength transmission film APF. The linearly polarized light enters the second polarizer PVA2 through the selective wavelength transmission film APF, and is absorbed by the second polarizer PVA2. The light may not return. At this time, the display device is in a dark state.

Figure 30:
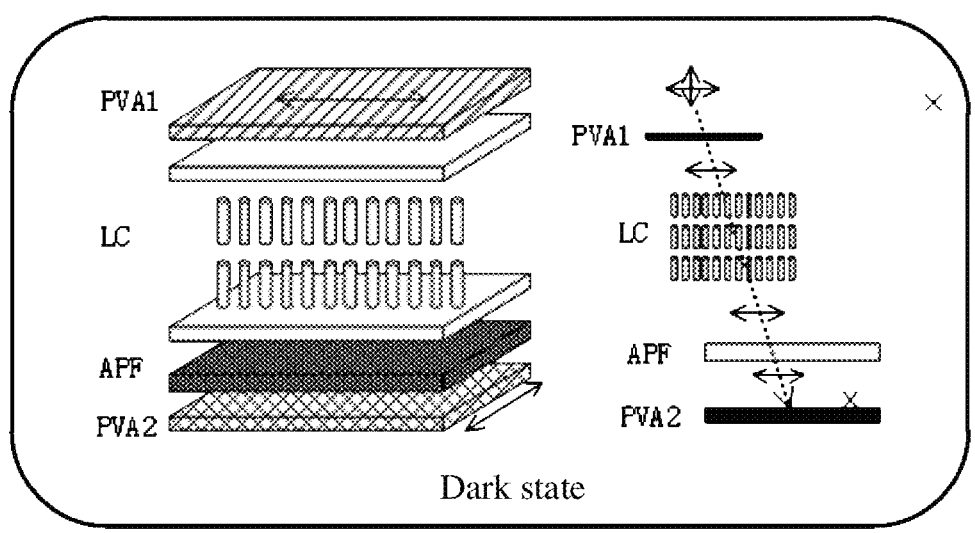
FIG. 30 schematically shows a schematic diagram of a display device in a dark state according to embodiments of the present disclosure.

FIG. 30 shows a schematic diagram of a display device in a dark state according to embodiments of the present disclosure. With reference to FIG. 30, when the display panel PAN is powered on, the ambient light becomes the linearly polarized light after passing through the first polarizer PVA1. After the linearly polarized light passes through the powered display panel PAN, the polarization direction of the linearly polarized light is rotated by 90 degrees and then the linearly polarized light enters the selective wavelength transmission film APF. As the selective wavelength transmission film APF have a reflection characteristic on the polarized light in this polarization direction, the light is reflected back to the display panel PAN by the selective wavelength transmission film APF (without entering the second polarizer PVA2). When the light exits from the display panel PAN, the polarization direction is rotated by 90 degrees again, thereby exiting through the first polarizer PVA1. At this time, the display device is in a bright state.

In some specific embodiments, the display device further includes a light-absorbing layer XL on a side of the selective wavelength transmission film APF away from the display panel PAN. The light-absorbing layer XL is used to absorb the second polarized light transmitted by the selective wavelength transmission film APF. Optionally, the light-absorbing layer XL may include materials such as black ink that may absorb light, thereby preventing light from passing through the light-absorbing layer XL.

It should be understood that according to embodiments of the present disclosure, the display device has the characteristics and advantages of the display substrate and the display panel PAN described above, and reference may be made to the previous descriptions, which will not be repeated here.

At least some embodiments of the present disclosure further provide a method of driving a display substrate. The display substrate includes: a first base substrate 101, a first transparent electrode layer 110 on the first base substrate 101, a second transparent electrode layer 120 on a side of the first transparent electrode layer 110 away from the first base substrate 101, and a plurality of first common signal lines 111 and a plurality of second common signal lines 112 in the first transparent electrode layer 110, where the plurality of first common signal lines 111 are arranged in a second direction Y, the plurality of second common signal lines 112 are arranged in a first direction X, the second direction Y intersects with the first direction X, and the plurality of first common signal lines 111 are electrically connected through the plurality of second common signal lines 112, and a sub-pixel PX on the first base substrate 101. The sub-pixel PX includes a pixel electrode 121 located in the second transparent electrode layer 120. The plurality of first common signal lines 111 and the plurality of second common signal lines 112 form a transparent conductive portion D. Furthermore, in a thickness direction of the display substrate, the pixel electrode 121 overlaps with the transparent conductive portion D, and in an overlapping region of the pixel electrode 121 and the transparent conductive portion D, the pixel electrode 121 and the transparent conductive portion D form a storage capacitor Cst of the sub-pixel PX. The display substrate also includes a data line DL, a first gate line GL1 and a second gate line GL2. The sub-pixel PX includes a switching transistor T. The switching transistor T includes a first electrode S1, a second electrode S2, a first gate G1 and a second gate G2. The first electrode S1 is electrically connected to the data line DL, the second electrode S2 is electrically connected to the pixel electrode 121, the first gate G1 is electrically connected to the first gate line GL1, and the second gate G2 is electrically connected to the second gate line GL2. The display substrate includes a plurality of sub-pixels PX arranged in an array in the second direction Y and the first direction X. A second gate line GL2 electrically connected to a second gate G2 of a switching transistor T of an $n^{th}$ row of sub-pixels PX and a first gate line GL1 electrically connected to a first gate G1 of a switching transistor T of an $(n+1)^{th}$ row of sub-pixels PX are electrically connected to a same scanning signal terminal, where n is a positive integer.

With reference to FIG. 16 to FIG. 18, the driving method in embodiments of the present disclosure includes as follows.

In a first data writing phase t1 of the $n^{th}$ row of sub-pixels PX, a valid level signal is provided to the first gate line GL1 electrically connected to the $n^{th}$ row of sub-pixels PX, and an invalid level signal is provided to the second gate line GL2 electrically connected to the $n^{th}$ row of sub-pixels.

In a second data writing phase t2 of the $n^{th}$ row of sub-pixels PX, a valid level signal is provided to the first gate line GL1 electrically connected to the $n^{th}$ row of sub-pixels, and a valid level signal is provided to the second gate line GL2 electrically connected to the $n^{th}$ row of sub-pixels.

In a display phase of the $n^{th}$ row of sub-pixels PX, an invalid level signal is provided to the first gate line GL1 electrically connected to the $n^{th}$ row of sub-pixels, and a valid level signal is provided to the second gate line GL2 electrically connected to the $n^{th}$ row of sub-pixels.

For example, in the first data writing phase t1 of the $n^{th}$ row of sub-pixels, a scanning signal terminal FO1 provides a valid level signal to the first gate line GL1 electrically connected to scanning signal terminal FO1, and a scanning signal terminal FO2 provides an invalid level signal to the second gate line GL2 electrically connected to the scanning signal terminal FO2.

In the second data writing phase t2 of the $n^{th}$ row of sub-pixels, the scanning signal terminal FO1 provides a valid level signal to the first gate line GL1 electrically connected to the scanning signal terminal FO1, and the scanning signal terminal FO2 provides a valid level signal to the second gate line GL2 electrically connected to the scanning signal terminal FO2. As the second gate line GL2 electrically connected to the $n^{th}$ row of sub-pixels and the first gate line GL1 electrically connected to the $(n+1)^{th}$ row of sub-pixels PX are electrically connected to the scanning signal terminal FO2, the scanning signal terminal FO2 also provides a valid level signal to the first gate line GL1 electrically connected to the $(n+1)^{th}$ row of sub-pixels PX. That is to say, the $(n+1)^{th}$ row of sub-pixels PX are in the first data writing phase t1 at this time.

In the display phase t3 of the $n^{th}$ row of sub-pixels, the scanning signal terminal FO1 provides an invalid level signal to the first gate line GL1 electrically connected to the scanning signal terminal FO1, and the scanning signal terminal FO2 provides a valid level signal to the second gate line GL2 electrically connected to the scanning signal terminal FO2. As the second gate line GL2 electrically connected to the $n^{th}$ row of sub-pixels and the first gate line GL1 electrically connected to the $(n+1)^{th}$ row of sub-pixels PX are electrically connected to the scanning signal terminal FO2, the scanning signal terminal FO2 also provides a valid level signal to the first gate line GL1 electrically connected to the $(n+1)^{th}$ row of sub-pixels PX, and the scanning signal terminal FO3 provides a valid level signal to the second gate line GL2 electrically connected to the $(n+1)^{th}$ row of sub-pixels PX. That is to say, the $(n+1)^{th}$ row of sub-pixels PX is in the second data writing phase t2 at this time. And so on, scanning row by row may be achieved.

It should be noted that for the non-detailed explanations in embodiments of the present disclosure, reference may be made to the aforementioned embodiments, which will not be repeated here.

Although some embodiments of the entire technical concept of the present disclosure have been shown and explained, those of ordinary skill in the art will understand that changes may be made to these embodiments without departing from the principle and spirit of the entire technical concept. The scope of the present disclosure is limited by the claims and their equivalents.

What is claimed is:

1. A display substrate, comprising:
a first base substrate;
a first transparent electrode layer on the first base substrate;
a second transparent electrode layer on a side of the first transparent electrode layer away from the first base substrate;
M first common signal lines and N second common signal lines in the first transparent electrode layer, wherein the M first common signal lines are arranged in a first direction, the N second common signal lines are arranged in a second direction, the first direction intersects with the second direction, and the M first common signal lines are electrically connected through the N second common signal lines, and wherein M and N are positive integers; and a sub-pixel on the first base substrate, wherein the sub-pixel comprises a pixel electrode located in the second transparent electrode layer, and the M first common signal lines and the N second common signal lines form a transparent conductive portion; and in a thickness direction of the display substrate, the pixel electrode overlaps with the transparent conductive portion, and in an overlapping region of the pixel electrode and the transparent conductive portion, the pixel electrode and the transparent conductive portion form a storage capacitor of the sub-pixel.

2. The display substrate of claim 1, wherein the pixel electrode comprises a middle portion and an edge portion surrounding the middle portion, and in the thickness direction of the display substrate, the edge portion overlaps with the transparent conductive portion.

3. The display substrate of claim 2, wherein a portion of the edge portion overlapping with the transparent conductive portion forms a first electrode plate of the storage capacitor, the transparent conductive portion forms a second electrode plate of the storage capacitor, and in a same sub-pixel, an orthographic projection of the portion of the edge portion overlapping with the transparent conductive portion on the first base substrate comprises a continuous annular structure.

4. The display substrate of claim 1, wherein the display substrate comprises a data line disposed on the first base substrate and electrically connected to the sub-pixel, the data line extends in the second direction, and at least one first common signal line comprises at least one first line segment;

in the thickness direction of the display substrate, the data line overlaps with the at least one first line segment, and in an overlapping region of the data line and the at least one first line segment, an orthographic projection of the data line on the first base substrate is located within an orthographic projection of the first line segment on the first base substrate; and the at least one first line segment comprises a first edge and a second edge arranged sequentially in the first direction, the data line comprises a third edge and a fourth edge arranged sequentially in the first direction, and in the overlapping region of the data line and the at least one first line segment, a distance between the first edge of the first line segment and the third edge of the data line is less than a distance between the second edge of the first line segment and the fourth edge of the data line.

5. The display substrate of claim 4, wherein the display substrate comprises a plurality of sub-pixels, each of the plurality of sub-pixels comprises a switching transistor, and a plurality of switching transistors are arranged in an array in the first direction and the second direction; and an orthographic projection of the at least one first line segment on the first base substrate is located between orthographic projections of two adjacent switching transistors in the second direction on the first base substrate.

6. The display substrate of claim 4, wherein in the thickness direction of the display substrate, the at least one first line segment overlaps with an edge of the pixel electrode on a side of the pixel electrode facing the data line, an overlapping portion of the at least one first line segment and the edge of the pixel electrode forms an adjustment portion of the transparent conductive portion, and a dimension of the adjustment portion in the first direction is positively correlated with a capacitance value of the storage capacitor.

7. The display substrate of claim 1, further comprising: a data line, a first gate line and a second gate line disposed on the first base substrate and electrically connected to the sub-pixel, wherein the N second common signal lines, the first gate line and the second gate line extend in the first direction, and the sub-pixel comprises a switching transistor;

the switching transistor comprises a first electrode, a second electrode, a first gate and a second gate, the first electrode is electrically connected to the data line, the second electrode is electrically connected to the pixel electrode, the first gate is electrically connected to the first gate line, and the second gate is electrically connected to the second gate line; and in the thickness direction of the display substrate, at least one second common signal line overlaps with the first gate line and the second gate line.

8. The display substrate of claim 7, further comprising: an active layer on a side of the first transparent electrode layer facing the first base substrate, wherein the switching transistor further comprises a first channel portion and a second channel portion located in the active layer, an orthographic projection of the first channel portion on the first base substrate at least partially overlaps with an orthographic projection of the first gate on the first base substrate, and an orthographic projection of the second channel portion on the first base substrate at least partially overlaps with an orthographic projection of the second gate on the first base substrate; and an aspect ratio of any one of the first channel portion and the second channel portion is less than or equal to 4; and wherein a channel length of the first channel portion and a channel length of the second channel portion are substantially equal to each other.

9. The display substrate of claim 7, wherein the at least one second common signal line is provided with a first hollow portion, and in the thickness direction of the display substrate, the first hollow portion overlaps with the first gate line and the second gate line.

10. The display substrate of claim 9, wherein an overlapping dimension between the first hollow portion and the first gate line in the second direction and an overlapping dimension between the first hollow portion and the second gate line in the second direction are less than a dimension of the data line in the first direction; and/or wherein an orthographic projection of the first hollow portion on the first base substrate comprises a strip-shaped structure extending in the first direction, and a dimension of the first hollow portion in the second direction is greater than or equal to a dimension of the data line in the first direction.

11. The display substrate of claim 9, wherein the at least one second common signal line comprises a first sub-line and a second sub-line arranged in the second direction, and the first hollow portion separates the first sub-line and the second sub-line; and in the thickness direction of the display substrate, the first sub-line of the at least one second common signal line at least partially overlaps with the first gate line, and the second sub-line at least partially overlaps with the second gate line.

12. The display substrate of claim 11, wherein the display substrate comprises a plurality of sub-pixels, and in the thickness direction of the display substrate, the first gate line and the second gate line electrically connected to a same sub-pixel overlap with pixel electrodes of two adjacent sub-pixels in the second direction, respectively;
    wherein for the first gate line and the second gate line connected to an $x^{th}$ sub-pixel, in the thickness direction of the display substrate, the pixel electrode of the $x^{th}$ sub-pixel overlaps with the first gate line, an orthographic projection of an overlapping portion of the pixel electrode of the $x^{th}$ sub-pixel and the first gate line on the first base substrate defines a first region, the pixel electrode of an $(x+1)^{th}$ sub-pixel overlaps with the second gate line, and an orthographic projection of an overlapping portion of the pixel electrode of the $(x+1)^{th}$ sub-pixel and the second gate line on the first base substrate defines a second region; and an orthographic projection of the first sub-line of the at least one second common signal line on the first base substrate at least partially overlaps with the first region, and an orthographic projection of the second sub-line of the at least one second common signal line on the first base substrate at least partially overlaps with the second region, and wherein x is a positive integer; and
    wherein the orthographic projection of the first sub-line of the at least one second common signal line on the first base substrate covers the first region, and the orthographic projection of the second sub-line of the at least one second common signal line on the first base substrate covers the second region.

13. The display substrate of claim 11, wherein the first sub-line and the second sub-line are electrically connected to each other through a connection bridge located at at least one end of the first hollow portion, and a dimension of the connection bridge in the first direction is greater than or equal to a dimension of the data line in the first direction; and
    wherein the connection bridge does not overlap with the data line, and a distance between the connection bridge and the data line in the first direction is less than a width of the data line.

14. The display substrate of claim 7, wherein at least one second common signal line is provided with a second hollow portion, and an orthographic projection of the switching transistor on the first base substrate is located within an orthographic projection of the second hollow portion on the first base substrate; and/or
    wherein the display substrate comprises a plurality of sub-pixels arranged in an array in the first direction and the second direction; and
    wherein a second gate line electrically connected to a second gate of a switching transistor of an $n^{th}$ row of sub-pixels and a first gate line electrically connected to a first gate of a switching transistor of an $(n+1)^{th}$ row of sub-pixels are electrically connected to a same scanning signal terminal, and n is a positive integer.

15. The display substrate of claim 1, further comprising: a data line and a third gate line disposed on the first base substrate and electrically connected to the sub-pixel,
    wherein the N second common signal lines and the third gate line extend in the first direction, and the sub-pixel comprises a switching transistor;
    the switching transistor comprises a first electrode, a second electrode, a first gate and a second gate, the first gate and the second gate are arranged in the first direction, the first electrode is electrically connected to the data line, the second electrode is electrically connected to the pixel electrode, and the first gate and the second gate are electrically connected to the third gate line; and
    in the thickness direction of the display substrate, at least one second common signal line overlaps with the third gate line.

16. The display substrate of claim 15, wherein in the thickness direction of the display substrate, the pixel electrode overlaps with the third gate line, and an orthographic projection of an overlapping portion of the pixel electrode and the third gate line on the first base substrate defines a third region, and an orthographic projection of at least one second common signal line on the first base substrate at least partially overlaps with the third region; and
    wherein the orthographic projection of the at least one second common signal line on the first base substrate covers the third region.

17. A display panel, comprising the display substrate of claim 1,
    wherein the display panel further comprises:
    a color filter substrate disposed opposite to the display substrate; and
    a liquid crystal layer between the display substrate and the color filter substrate,
    wherein the color filter substrate comprises a second base substrate and a common electrode disposed on the second base substrate, the common electrode is electrically connected to the first common signal line and the second common signal line in the display substrate, the liquid crystal layer comprises a plurality of liquid crystal molecules, and the common electrode and the pixel electrode on the display substrate are configured such that: in response to a driving signal, an electric field driving a rotation of the liquid crystal molecules is formed.

18. The display panel of claim 17, wherein a ratio of a cell gap of the liquid crystal layer to a distance between the first transparent electrode layer and the second transparent electrode layer is greater than or equal to 20:1.

19. A reflective display device comprising the display panel of claim 17, wherein the display device further comprises:
    a first polarizer;
    a selective wavelength transmission film on a side of the display panel away from the first polarizer; and
    a second polarizer on a side of the selective wavelength transmission film away from the first polarizer,
    wherein the first polarizer has a first transmission axis and is configured to generate a first polarized light with a polarization direction parallel to the first transmission axis, the second polarizer has a second transmission axis and is configured to generate a second polarized light with a polarization direction parallel to the second transmission axis, and an extension direction of the first transmission axis intersects with an extension direction of the second transmission axis; and
    the selective wavelength transmission film is configured to reflect the first polarized light and transmit the second polarized light; and
    wherein the display device further comprises: a light-absorbing layer on a side of the selective wavelength transmission film away from the display panel, wherein the light-absorbing layer is configured to absorb the second polarized light transmitted by the selective wavelength transmission film.

20. A method of driving a display substrate, wherein the display substrate comprises:
- a first base substrate;
- a first transparent electrode layer on the first base substrate;
- a second transparent electrode layer on a side of the first transparent electrode layer away from the first base substrate;
- M first common signal lines and N second common signal lines in the first transparent electrode layer, wherein the M first common signal lines are arranged in a first direction, the N second common signal lines are arranged in a second direction, the first direction intersects with the second direction, and the M first common signal lines are electrically connected through the N second common signal lines, and wherein M and N are positive integers; and,
- a sub-pixel on the first base substrate,
- wherein the sub-pixel comprises a pixel electrode located in the second transparent electrode layer, and the M first common signal lines and the N second common signal lines form a transparent conductive portion; and in a thickness direction of the display substrate, the pixel electrode overlaps with the transparent conductive portion, and in an overlapping region of the pixel electrode and the transparent conductive portion, the pixel electrode and the transparent conductive portion form a storage capacitor of the sub-pixel;
- wherein the display substrate further comprises a data line, a first gate line and a second gate line, and the sub-pixel comprises a switching transistor; the switching transistor comprises a first electrode, a second electrode, a first gate and a second gate, the first electrode is electrically connected to the data line, the second electrode is electrically connected to the pixel electrode, the first gate is electrically connected to the first gate line, and the second gate is electrically connected to the second gate line;
- wherein the display substrate comprises a plurality of sub-pixels arranged in an array in the first direction and the second direction; a second gate line electrically connected to a second gate of a switching transistor of an $n^{th}$ row of sub-pixels and a first gate line electrically connected to a first gate of a switching transistor of an $(n+1)^{th}$ row of sub-pixels are electrically connected to a same scanning signal terminal, and n is a positive integer; and
- wherein the driving method comprises:
- in a first data writing phase of the $n^{th}$ row of sub-pixels, providing a valid level signal to the first gate line electrically connected to the $n^{th}$ row of sub-pixels, and providing an invalid level signal to the second gate line electrically connected to the $n^{th}$ row of sub-pixels;
- in a second data writing phase of the $n^{th}$ row of sub-pixels, providing a valid level signal to the first gate line electrically connected to the $n^{th}$ row of sub-pixels, and providing a valid level signal to the second gate line electrically connected to the $n^{th}$ row of sub-pixels; and
- in a display phase of the $n^{th}$ row of sub-pixels, providing an invalid level signal to the first gate line electrically connected to the $n^{th}$ row of sub-pixels, and providing a valid level signal to the second gate line electrically connected to the $n^{th}$ row of sub-pixels.

* * * * *